(12) United States Patent
Lee et al.

(10) Patent No.: US 12,444,164 B2
(45) Date of Patent: *Oct. 14, 2025

(54) IMAGE SENSOR INCLUDING INTERNAL PRE-PROCESSOR CONFIGURED TO GENERATE A MERGED IMAGE, IMAGE PROCESSING SYSTEM INCLUDING THE SAME, AND IMAGE PROCESSING METHOD

(71) Applicant: SAMSUNG ELECTRONICS CO., LTD., Suwon-si (KR)

(72) Inventors: Daeho Lee, Seoul (KR); Chulhee Park, Hwaseong-si (KR); Minoh Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

This patent is subject to a terminal disclaimer.

(21) Appl. No.: 17/929,937

(22) Filed: Sep. 6, 2022

(65) Prior Publication Data
US 2023/0073138 A1 Mar. 9, 2023

(30) Foreign Application Priority Data
Sep. 7, 2021 (KR) .................... 10-2021-0118959

(51) Int. Cl.
*G06V 10/60* (2022.01)
*G06T 5/50* (2006.01)
*G06T 5/70* (2024.01)
*G06T 5/90* (2024.01)
*G06T 7/20* (2017.01)
(Continued)

(52) U.S. Cl.
CPC ............... *G06V 10/60* (2022.01); *G06T 5/50* (2013.01); *G06T 5/70* (2024.01); *G06T 5/90* (2024.01); *G06T 7/20* (2013.01); *G06V 10/141* (2022.01); *G06V 10/56* (2022.01); *G06T 2207/10024* (2013.01); *G06T 2207/10144* (2013.01); *G06T 2207/20182* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS 9,160,934 B2 10/2015 Ichikawa
9,451,173 B2 * 9/2016 Kang ..................... H04N 23/73
10,136,080 B2 * 11/2018 Nishikawa ........... H04N 25/589
(Continued)

FOREIGN PATENT DOCUMENTS

JP 6052379 12/2016
JP 6184290 8/2017
KR 10-2021-0009255 1/2021

*Primary Examiner* — Akwasi M Sarpong
*Assistant Examiner* — Pawan Dhingra
(74) *Attorney, Agent, or Firm* — Morgan, Lewis & Bockius LLP

(57) ABSTRACT

An image sensor includes a sensing unit configured to generate a plurality of images having different exposure times for a same object, a pre-processor configured to generate a merged image by merging the plurality of images, an interface circuit configured to output at least one of the plurality of images and/or the merged image to an external processor, and a controller configured to control the pre-processor to selectively generate the merged image based on information of the plurality of images.

20 Claims, 19 Drawing Sheets

(51) Int. Cl.
*G06V 10/141* (2022.01)
*G06V 10/56* (2022.01)

(56) References Cited

U.S. PATENT DOCUMENTS

| | | | |
|---|---|---|---|
| 2010/0328490 A1* | 12/2010 | Kurane | H04N 25/583 |
| | | | 348/584 |
| 2012/0188439 A1* | 7/2012 | Mikes | H04N 23/741 |
| | | | 348/E5.037 |
| 2013/0202202 A1* | 8/2013 | Hasu | G06T 3/4053 |
| | | | 382/166 |
| 2014/0307117 A1* | 10/2014 | Feng | H04N 23/741 |
| | | | 348/218.1 |
| 2015/0130967 A1* | 5/2015 | Pieper | H04N 23/73 |
| | | | 348/239 |
| 2015/0244916 A1* | 8/2015 | Kang | H04N 23/741 |
| | | | 348/222.1 |
| 2017/0118453 A1* | 4/2017 | Kim | H04N 23/84 |
| 2018/0082408 A1* | 3/2018 | Dewhurst | H04N 23/741 |
| 2018/0131884 A1* | 5/2018 | Nishikawa | H04N 25/589 |
| 2018/0167544 A1* | 6/2018 | Jeong | H04N 25/78 |
| 2020/0211166 A1 | 7/2020 | Yao et al. | |
| 2021/0021751 A1* | 1/2021 | Lee | H04N 19/42 |
| 2021/0073956 A1* | 3/2021 | Guerin | G06T 5/70 |
| 2021/0133986 A1* | 5/2021 | Lee | G06T 7/0002 |

* cited by examiner

IMAGE SENSOR INCLUDING INTERNAL PRE-PROCESSOR CONFIGURED TO GENERATE A MERGED IMAGE, IMAGE PROCESSING SYSTEM INCLUDING THE SAME, AND IMAGE PROCESSING METHOD

CROSS-REFERENCE TO RELATED APPLICATION

This application claims priority under 35 U.S.C. § 119 to Korean Patent Application No. 10-2021-0118959, filed on Sep. 7, 2021 in the Korean Intellectual Property Office, the disclosure of which is incorporated by reference herein in its entirety.

TECHNICAL FIELD

Embodiments of the inventive concept relate to image processing, and more particularly, to an image sensor that performs pre-processing on an input image to extend a dynamic range of an output image, and an image processing system including the same.

DISCUSSION OF RELATED ART

An image processing system such as, for example, a camera, may include an image sensor that converts an optical signal of an object incident through an optical lens into an electrical signal, and a processor that performs image processing on the generated image. A range of brightness acceptable to an image sensor is narrower than a range of brightness acceptable to the human eye. Accordingly, an image captured in a backlight illuminating situation may be different from an actual image viewed by the human eye, such as a bright background and an excessively dark object. Due to this, high dynamic range (HDR) technology is used, which generates a plurality of images having different exposure times by capturing an image of the same object at different exposure times and extends a dynamic range of an image by performing image processing on the plurality of images.

SUMMARY

Embodiments of the inventive concept provide an image sensor that increases a dynamic range of an output image of an image processing system through pre-processing including high dynamic range (HDR) processing based on information of images, and an image processing system including the same.

According to an embodiment of the inventive concept, an image sensor includes a sensing unit configured to generate a plurality of images having different exposure times for a same object, a pre-processor configured to generate a merged image by merging the plurality of images, an interface circuit configured to output at least one of the plurality of images and/or the merged image to an external processor, and a controller configured to control the pre-processor to selectively generate the merged image based on information of the plurality of images.

According to an embodiment of the inventive concept, an image processing system includes an image sensor configured to generate a plurality of images having different exposure times for a same object and output the plurality of images, a first HDR module configured to determine whether to generate a merged image based on information on the plurality of images and generate a merged image with an increased dynamic range by merging the plurality of images, and an image processor configured to receive at least one of the plurality of images and/or the merged image.

According to an embodiment of the inventive concept, an image processing method includes generating a plurality of images having different exposure times for a same object, determining one of a first mode in which the plurality of images are merged before motion compensation processing is performed and a second mode in which the plurality of images are merged after the motion compensation processing is performed, based on information of the plurality of images, and generating a merged image with an increased dynamic range by merging the plurality of images in the first mode.

BRIEF DESCRIPTION OF THE DRAWINGS

The above and other features of the inventive concept will become more apparent by describing in detail embodiments thereof with reference to the accompanying drawings, in which.

DETAILED DESCRIPTION OF THE EMBODIMENTS

Figure 1:
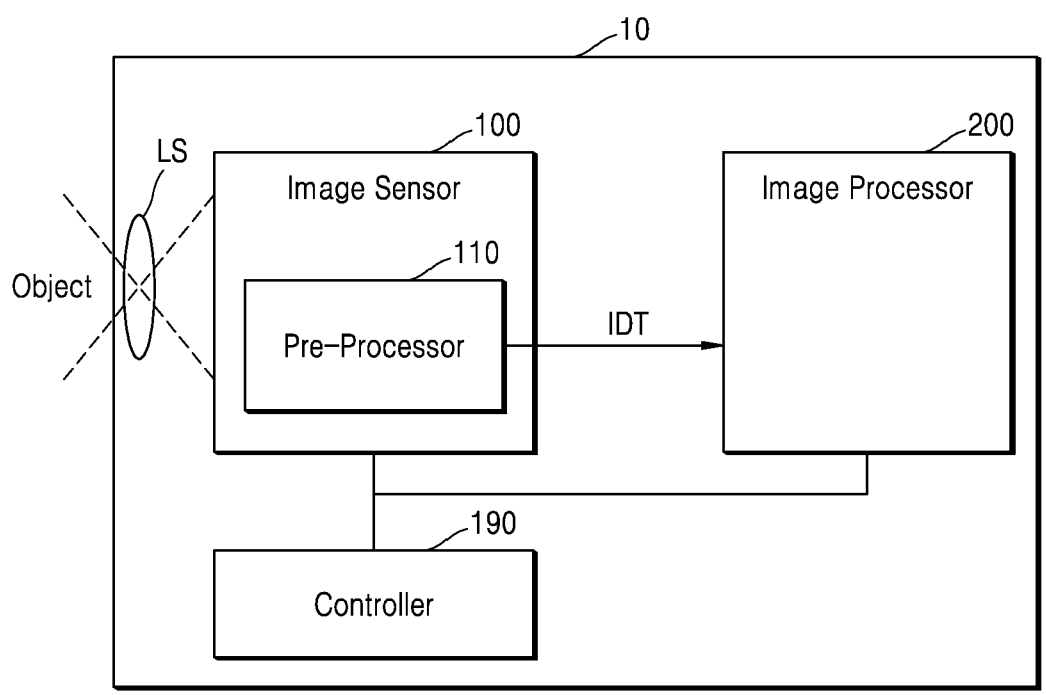
FIG. 1 is a block diagram illustrating an image processing system according to an example embodiment of the inventive concept.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

As used herein, the term "and/or" includes any and all combinations of one or more of the associated listed items. Expressions such as "at least one of," when preceding a list of elements, modify the entire list of elements and do not modify the individual elements of the list.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating an image processing system according to an example embodiment of the inventive concept.

An image processing system 10 may be embedded in an electronic device or implemented by the electronic device. The electronic device captures an image and displays the captured image, or performs an operation based on the captured image, and includes an electronic apparatus such as, for example, a digital camera, a smartphone, a wearable device, an Internet of things (IoT) device, a personal computer (PC), a tablet PC, a personal digital assistant (PDA), a portable multimedia player (PMP), a navigation device, or a drone, or may be mounted on an electronic apparatus provided as a component in, for example, a vehicle, a medical apparatus, furniture, a manufacturing facility, a security device, a door, various measurement devices, etc.

Referring to FIG. 1, the image processing system 10 may include an image sensor 100, an image processor 200, and a controller 190. The image processing system 10 may further include other components such as a display and a user interface. The image sensor 100 may include a pre-processor 110. The pre-processor 110 may include a first high dynamic range (HDR) module that performs HDR processing, and the image processor 200 may include a second HDR module that performs HDR processing.

The image sensor 100 may convert an optical signal of an object incident through an optical lens LS into an electrical signal and generate an image based on the electrical signal. The image sensor 100 may generate a plurality of images having different luminance for the same object. For example, the image sensor 100 may generate multiple exposed images by capturing an image of the same object based on different exposure times. Alternatively, when a plurality of photoelectric conversion elements are provided in each pixel of a pixel array 120 of FIG. 2, the image sensor 100 may generate a plurality of images having different luminance by adjusting the number of photoelectric conversion elements used for image sensing.

The pre-processor 110 may generate a merged image by merging two or more partial images among the plurality of images having different luminance. In an embodiment, the pre-processor 110 may generate the merged image with an increased dynamic range compared to each of the partial images by performing linearization processing on the partial images. The linearization processing indicates a processing method of linearly increasing (or decreasing) brightness by matching the brightness of at least two images having different brightness ranges and selecting a more appropriate pixel value for a preset region in which brightness increases (or decreases) non-linearly or performing an operation on the pixel values of at least two images. The linearization processing may increase a dynamic range of an image and may increase the number of bits of each pixel value of the image. The HDR processing may include the linearization processing.

The image sensor 100 may transmit at least one of a captured image, a linearized image, and a merged image to the image processor 200 as image data IDT. In an embodiment, the image sensor 100 may compress the merged image and transmit the image data IDT including the compressed image to the image processor 200.

The image processor 200 may perform image processing on a received image. In this case, the image processing may include various types of processing such as, for example, processing for image quality improvement such as noise removal, brightness adjustment, and sharpness adjustment, image processing (for example, converting Bayer pattern image data into YUV format data or RGB format data) for changing image size and data format, etc.

An HDR module may be included in the pre-processor 110 of the image sensor 100 or the image processor 200 thereof. The HDR module may perform HDR processing on image data, for example, a merged image and at least one linearized image. In an embodiment, when the HDR module is included in the image sensor 100, the image processor 200 decompresses the compressed image, and the HDR module may perform HDR processing on the decompressed merged image and at least one image.

The HDR processing may include linearization processing and dynamic range compression (DRC) processing. The DRC processing may include tone mapping (for example, gamma correction). According to the tone mapping, a relatively bright region may be corrected to be darker and a relatively dark region may be corrected to be brighter. As HDR processing is performed on the merged image and at least one image, an HDR image with an increased dynamic range and improved signal to noise ratio (SNR) may be generated. The image processing described above may be performed on the HDR image in various ways. However, embodiments of the inventive concept are not limited thereto. For example, according to embodiments, at least one of the various types of image processing may be performed during the HDR processing.

The image sensor 100 according to an embodiment of the inventive concept may merge some exposed images among a plurality of exposed images, and transmit the merged image and the remaining exposed images to the image processor 200. For example, the HDR module included in the pre-processor 110 may first perform HDR processing on short-exposed images and medium-exposed images, and the HDR module included in the image processor 200 may perform the HDR processing on long-exposed images.

In an embodiment, the HDR module may perform real-time HDR processing. The HDR module may perform real-time HDR processing on the merged image received in a staggered manner in units of lines and at least one image on which the linearization processing is not performed. The generated HDR image may be output as one frame of a preview image and a video.

The image processor 200 may be implemented by hardware, software (or firmware), or a combination of hardware and software. The image processor 200 may be implemented by one of various processors, which may perform image processing, such as a graphics processing unit (GPU), a digital signal processor (DSP), and an image signal processor (ISP). The image processor 200 may be implemented as a single chip or may be embedded in an application processor.

The controller 190 may determine which one of the HDR module of the pre-processor 110 and the HDR module of the image processor 200 to process a plurality of captured images, based on an imaging time interval or motion information of a plurality of images captured by the image sensor 100.

As described above, in the image processing system 10 according to an embodiment of the inventive concept, an HDR module of the pre-processor 110 performs HDR processing on some images among a plurality of images, based on information of captured image data, and an HDR module of the image processor 200 may perform HDR processing, for example, linearization processing and DRC processing, on the remaining images, and thus, effective HDR processing may be performed on image data. In addition, when the pre-processor 110 of the image sensor 100 performs HDR processing on some images, the image processor 200 may perform image processing only on merged images instead of a plurality of images, and thus, the amount of processing of the image processor 200 for the HDR processing may be reduced, and a speed of the HDR processing of the image processing system 10 may be increased. For example, when the image processing system 10 performs HDR processing, that is, real-time HDR processing, at the time of generating a preview image and a video image, the performance of the image processing system 10 may be increased. The image processing method according to an embodiment of the inventive concept may be more effectively utilized when imaging time intervals of a plurality of captured images are short or motion thereof is small.

Figure 2:
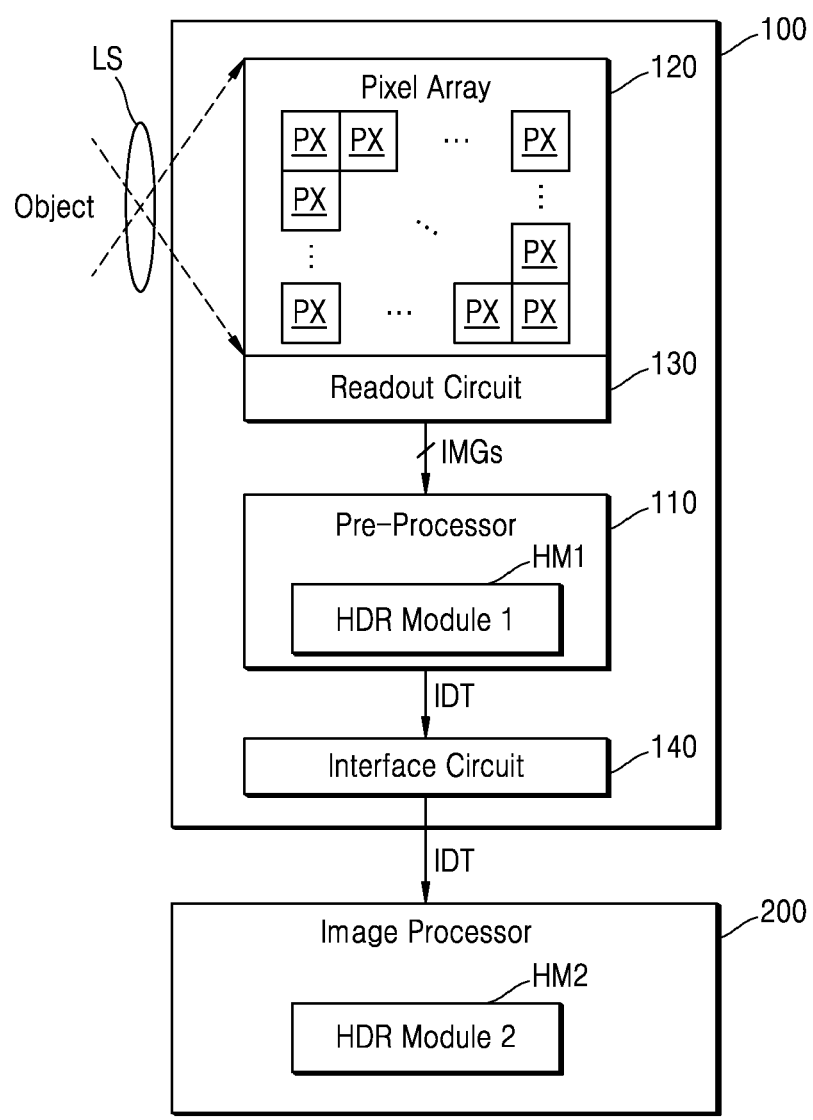
FIG. 2 is a block diagram illustrating an image sensor according to an example embodiment of the inventive concept.

FIG. 2 is a block diagram schematically illustrating an image sensor according to an example embodiment of the inventive concept.

Referring to FIG. 2, the image sensor 100 may include a pixel array 120, a readout circuit 130, a pre-processor 110, and an interface circuit 140. The pixel array 120 and the readout circuit 130 may be referred to as a sensing unit. The image sensor 100 may further include other components for driving the pixel array 120, such as, for example, a row decoder, a timing controller, and a ramp signal generator.

The pixel array 120 may be implemented by, for example, a transmission device such as a charge coupled device (CCD) or a complementary metal oxide semiconductor (CMOS), and may be implemented by various types of transmission devices. The pixel array 120 may include a plurality of pixels PX that convert a received optical signal (light) into an electrical signal, and the plurality of pixels may be arranged in a matrix. Each of the plurality of pixels PX may include a photo-sensing element (also referred to as a photoelectric conversion element). For example, the photo-sensing element may include a photodiode, a phototransistor, a photogate, or a pinned photodiode. The plurality of pixels PX may be driven in units of lines (also referred to as units of rows) and may output sensing signals in units of columns. The plurality of pixels PX may be connected to a plurality of column lines and may output electrical signals to the readout circuit 130 through the plurality of column lines.

The readout circuit 130 may convert the electrical signals received from the pixel array 120 into images and output the images. The readout circuit 130 may amplify electrical signals and may perform analog-digital conversion on the amplified electrical signals. The image generated by the readout circuit 130 may include a pixel value corresponding to each of the pixels of the pixel array 120.

The readout circuit 130 may generate a plurality of images IMGs having different luminance, and output the plurality of images IMGs in units of rows. As described above with reference to FIG. 1, the plurality of images IMGs are multiple exposed images generated based on signals obtained based on different exposure times by the pixel array 120, or the plurality of images may be generated by adjusting the number of photoelectric conversion elements included in the pixels PX. However, embodiments of the inventive concept are not limited thereto. For example, in an embodiment, the plurality of images IMGs having different luminance may be generated by various driving methods for the pixel array 120 and a read operation of the readout circuit 130. Hereinafter, it is assumed that the plurality of images IMGs are multiple exposed images for convenience of description.

In an embodiment, the readout circuit 130 may simultaneously output the plurality of images IMGs to the pre-processor 110 in a time division manner (or a staggered manner), or sequentially output the plurality of images IMGs to the pre-processor 110. In an embodiment, the pre-processor 110 may include a line buffer that stores a plurality of pixel values corresponding to some lines of the plurality of images IMGs, and the sensing unit may output the plurality of images IMG to the pre-processor 110 according to a time division method in units of lines.

As described above with reference to FIG. 1, the pre-processor 110 may generate a single merged image by performing pre-processing, for example, linearization processing, on some of the plurality of images IMGs. In addition, the pre-processor 110 may perform signal processing of adjusting pixel values for each of the plurality of images IMGs. For example, the signal processing may include at least one of black level compensation, lens shading compensation, crosstalk compensation, and bad pixel correction.

The pre-processor 110 may include a first HDR module HM1, and the first HDR module HM1 may perform linearization processing on a plurality of received images and generate a single merged image. The first HDR module HM1 may perform HDR processing on a plurality of captured images having a short imaging interval or a small motion.

The pre-processor 110 may output the pre-processed image or the merged image to the interface circuit 140 as image data IDT. The pre-processor 110 may further include a compressor that compresses the merged image to generate a compressed image.

The interface circuit 140 may transmit the image data IDT to the image processor 200. Since the image processor 200 is external to the image sensor 100, the image processor 200 may also be referred to as an external processor with relation to the image sensor 100. The interface circuit 140 may communicate with the image processor 200 according to one of various interfaces such as, for example, a mobile industry processor interface (MIPI), an embedded display port (eDP) interface, a universal asynchronous receiver transmitter (UART) interface, an inter integrated circuit (I2C) interface, and a serial peripheral interface (SPI).

The image processor 200 may include a second HDR module HM2 and may perform the same operation as the first HDR module HM1. The second HDR module HM2 may perform HDR processing on a plurality of captured images having a long imaging interval or a large motion.

Figure 3:
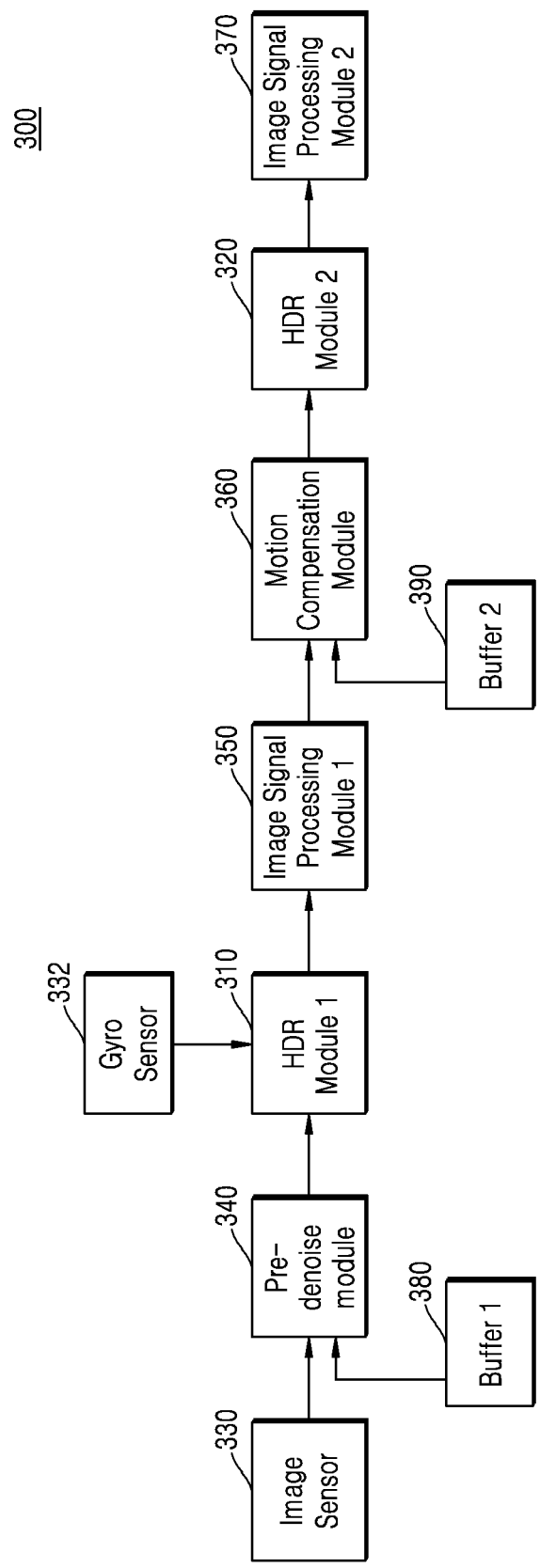
FIG. 3 is a diagram illustrating an image processing system according to an example embodiment of the inventive concept.

FIG. 3 is a diagram illustrating an image processing system according to an example embodiment of the inventive concept.

Referring to FIG. 3, an image processing system 300 may include a first HDR module 310, a second HDR module 320, an image sensor 330, a gyro sensor 332, a pre-denoise module 340, a first image signal processing module 350, a motion compensation module 360, a second image signal processing module 370, a first buffer 380, and a second buffer 390. The image sensor 330 of FIG. 3, the gyro sensor 332, the pre-denoise module 340, and the first HDR module 310 may be included in the image sensor 100 of FIG. 1, and the first image signal processing module 350 of FIG. 3, the motion compensation module 360, the second image signal processing module 370, and the second HDR module 320 may be included in the image processor 200 of FIG. 1. For convenience of explanation, a further description of components and technical aspects previously described with reference to FIGS. 1 and 2 is omitted.

The first HDR module 310 or the second HDR module 320 may perform HDR processing on image data, for example, a merged image and at least one image on which linearization processing is not performed. The first HDR module 310 or the second HDR module 320 may perform real-time HDR processing. The first HDR module 310 or the second HDR module 320 may perform real-time HDR processing on a merged image received in a staggered manner in units of lines and at least one image on which linearization processing is not performed.

The first HDR module 310 may first perform HDR processing on short-exposed images and medium-exposed images, and the second HDR module 320 may perform HDR processing on long-exposed images.

The first HDR module 310 may perform HDR processing on a plurality of captured images having a short imaging interval or a small motion. The second HDR module 320 may perform HDR processing on a plurality of captured images having a long imaging interval or a large motion.

The first HDR module 310 may perform HDR processing on a Bayer pattern image and may also perform HDR processing on a multi-spectral image such as an RGB-W pattern image through hardware sharing.

The gyro sensor 332 measures angular velocity and may measure a position or movement of an image sensor or a camera module. The image processing system 300 may generate motion data of the captured image based on data measured by the gyro sensor 332 and may perform motion compensation on the captured image.

The pre-denoise module 340 may remove noise of an image captured by the image sensor 330. The pre-denoise module 340 may perform the linearization processing described with reference to FIG. 1.

The first image signal processing module 350 or the second image signal processing module 370 may perform various types of image processing on the received image. In this case, the image processing may include various types of processing such as, for example, processing for image quality improvement such as noise removal, brightness adjustment, and sharpness adjustment, image processing (for example, converting Bayer pattern image data into YUV format data or RGB format data) for changing image size and data format, etc.

The first buffer 380 or the second buffer 390 may be utilized to temporarily store a plurality of captured images and to compare and analyze before and after images.

In addition to the linearization processing performed by the pre-denoise module 340, the motion compensation module 360 may perform motion estimation for estimating from which pixel of the before and the after images a value of each pixel is shifted, and may perform motion compensation for normalizing a distorted image through x-axis movement, y-axis movement, rotation, and scale operations of an image and for compensating for inaccuracy of a motion estimated from the before and after images.

Figure 4A:
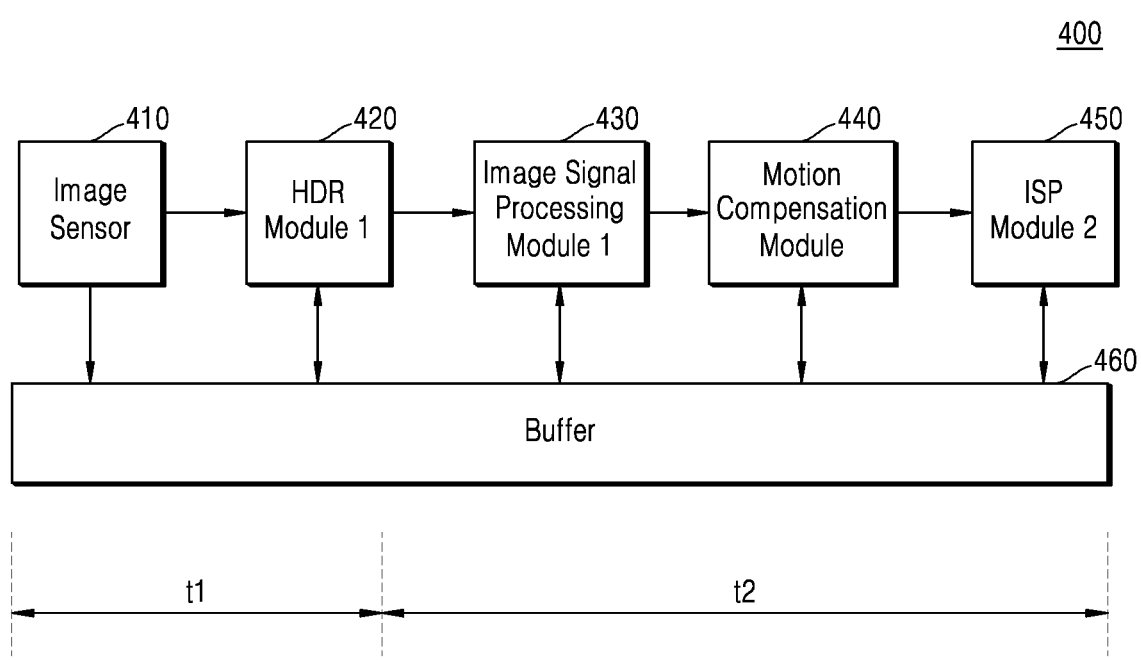
FIGS. 4A and 4B are diagrams illustrating high dynamic range (HDR) processing operations for two exposed images by the image processing system according to an example embodiment of the inventive concept.
Figure 4B:
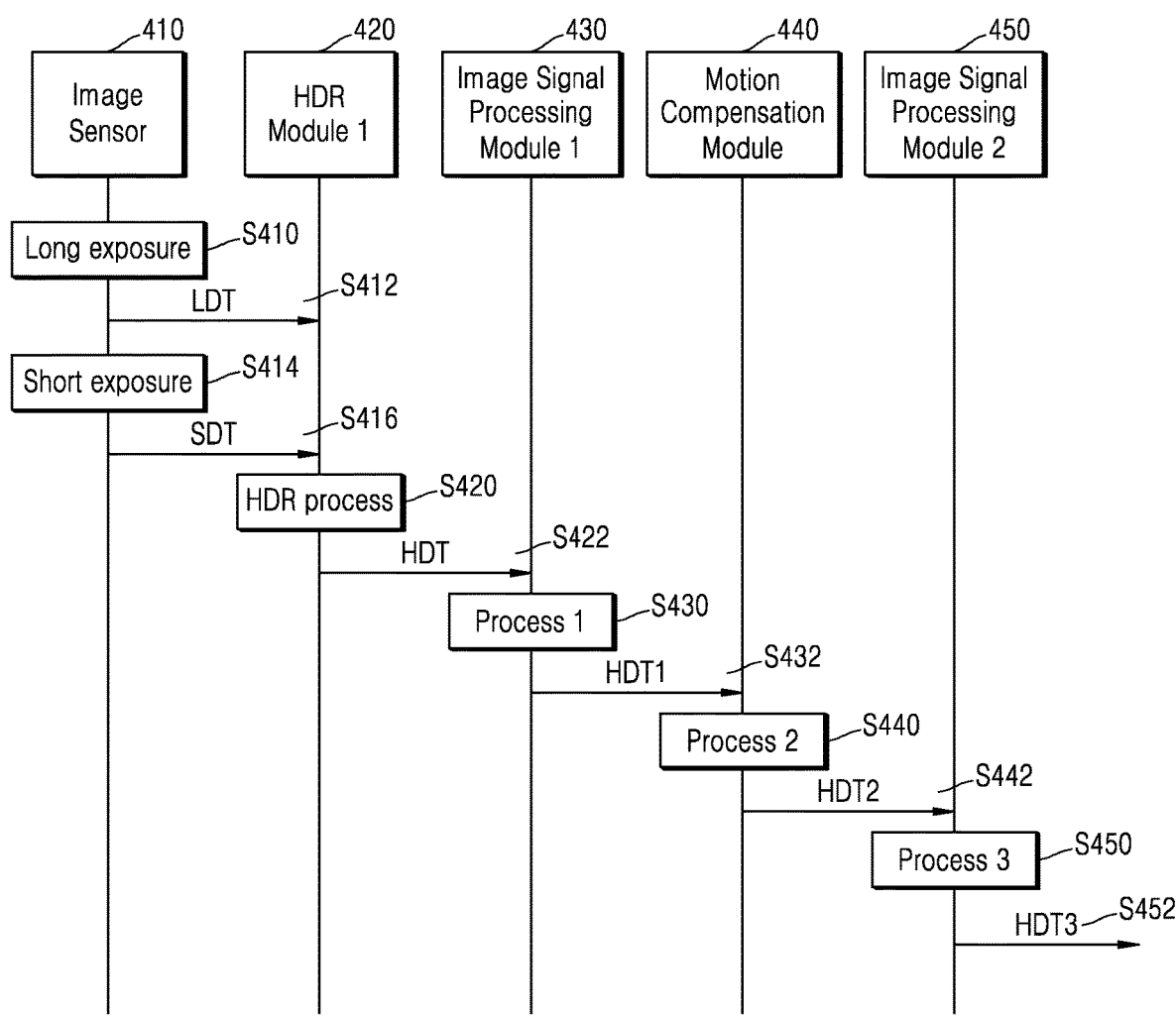

FIGS. 4A and 4B are diagrams illustrating an HDR processing operation on two exposed images which is performed by an image processing system according to an example embodiment of the inventive concept.

Referring to FIG. 4A, an image processing system 400 includes an image sensor 410, a first HDR module 420, a first image signal processing module 430, a motion compensation (MC) module 440, a second image signal processing module 450, and a buffer 460. For convenience of explanation, a further description of components and technical aspects previously described with reference to the image processing system 400 made with reference to FIGS. 1 to 3 is omitted. FIGS. 4A and 4B illustrate that the first HDR module 420 performs HDR processing, and a configuration corresponding to the second HDR module 320 of FIG. 3 is omitted.

The image processing system 400 may perform HDR processing on a plurality of captured images having a short imaging interval or a small motion by using the first HDR module 420. For example, when the image processing system 400 performs HDR processing on two exposed images, the first HDR module 420 may receive the two exposed images captured by the image sensor 410 and merge the two exposed images. The image processing system 400 may transmit the merged image to the first image signal processing module 430, and then perform image processing including motion compensation. A second period t2 for performing image processing on the HDR-processed merged image may be determined based on a first period t1 for performing HDR processing and merging. In this case, the first image signal processing module 430 may perform image processing including, for example, Bayer processing, RGB processing, and motion compensation only on the merged image, perform image processing on two exposed images before merging, and perform image processing faster than when HDR processing and merging are performed.

The buffer 460 may include a frame buffer for temporarily storing image data or a line buffer for processing a staggered image.

Referring to FIG. 4B, the image sensor 410 may generate a long-exposed image LDT (S410) and transmit the generated long-exposed image LDT to the first HDR module 420 (S412). Thereafter, the image sensor 410 may generate a short-exposed image SDT (S414) and transmit the generated short-exposed image SDT to the first HDR module 420 (S416).

When receiving the long-exposed image LDT and the short-exposed image SDT, the first HDR module 420 may perform HDR processing and merging and generate a merged image HDT (S420). The first HDR module 420 may transmit the generated merged image HDT to the first image signal processing module 430. The first image signal processing module 430 may perform first image processing on the received merged image HDT (S430) and transmit a first merged image HDT1 to the motion compensation module 440 (S432). The motion compensation module 440 may perform motion compensation on the first merged image HDT1 (S440) and transmit a second merged image HDT2 to the second image signal processing module 450 (S442). The second image signal processing module 450 may perform second image processing (S450) and output a third merged image HDT3. In this case, the first image signal processing module 430 and the motion compensation module 440 perform image processing only on the merged image HDT, and thus, the first image signal processing module 430 and the motion compensation module 440 may perform image processing faster than when image processing is performed on each of the long-exposed image LDT and the short-exposed image SDT before merging.

Figure 5A:
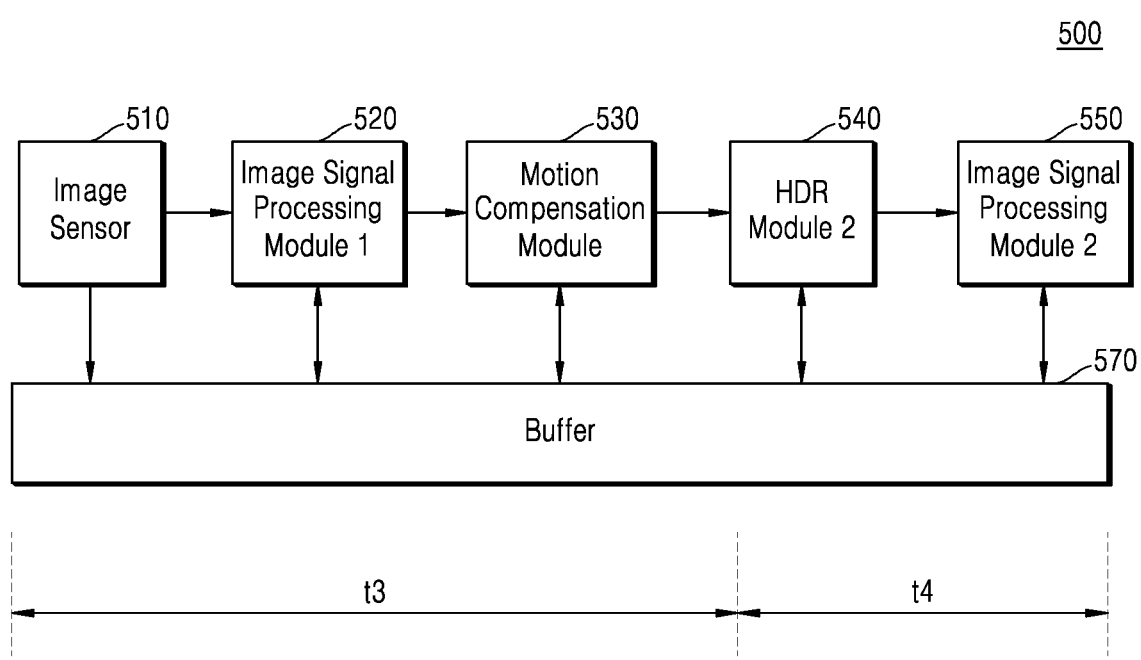
FIGS. 5A and 5B are diagrams illustrating operations of an image processing system according to a comparative example.
Figure 5B:
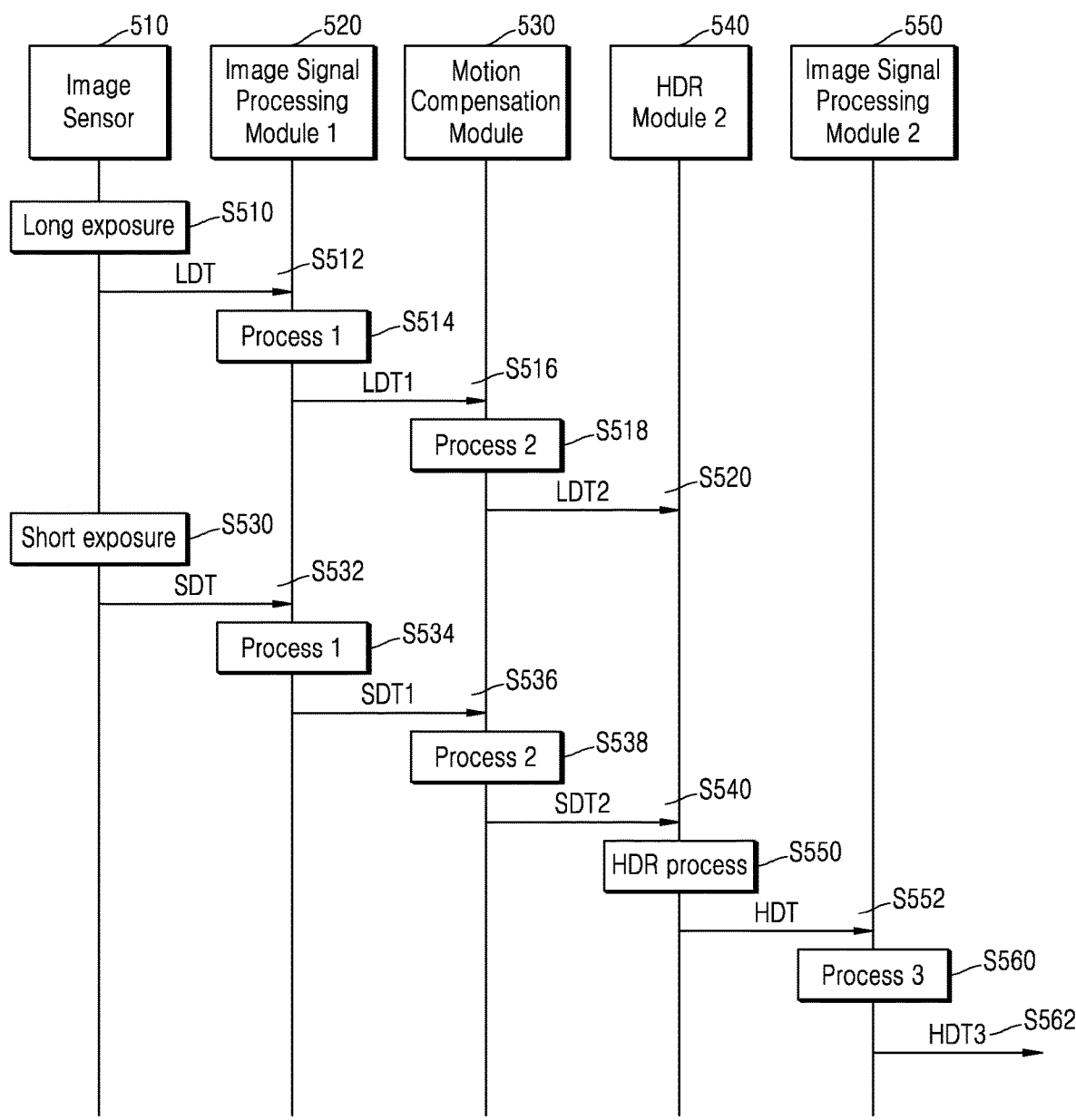

FIGS. 5A and 5B are diagrams illustrating an operation of an image processing system according to a comparative example.

Referring to FIG. 5A, an image processing system 500 may include an image sensor 510, a first image signal processing module 520, a motion compensation module 530, a second HDR module 540, a second image signal processing module 550, and a buffer 570. For convenience of explanation, a further description of components and technical aspects previously described with reference to the image processing system 500 made with reference to FIGS. 1 to 3 is omitted. In FIGS. 5A and 5B, the second HDR module 540 performs HDR processing, and a configuration corresponding to the first HDR module 310 of FIG. 3 is omitted.

The image processing system 500 may perform HDR processing on a plurality of captured images having a long imaging interval or a large motion. For example, when performing HDR processing on two exposed images, the image processing system 500 may receive the two exposed images captured by the image sensor 510, transmit the two exposed images to the first image signal processing module 520, and image processing is performed thereon. The image processing system 500 may transmit, to the second HDR module 540, the two exposed images on which the first image processing and motion compensation are performed, and the second HDR module 540 may merge the two exposed images.

Referring to FIG. 5B, the image sensor 510 may generate a long-exposed image LDT (S510) and transmit the generated long-exposed image LDT to the first image signal processing module 520 (S512). The first image signal processing module 520 may perform first image processing on the long-exposed image LDT (S514) and transmit a generated first long-exposed image LDT1 to the motion compensation module 530 (S516). The motion compensation module 530 may perform motion compensation on the first long-exposed image LDT1 (S518) and transmit a second long-exposed image LDT2 to the second HDR module 540 (S520).

The image sensor 510 may generate a short-exposed image SDT (S530) and transmit the generated short-exposed image SDT to the first image signal processing module 520 (S532). The first image signal processing module 520 may perform first image processing on the short-exposed image SDT (S534) and transmit a generated first short-exposed image SDT1 to the motion compensation module 530 (S536). The motion compensation module 530 may perform motion compensation on the first short-exposed image SDT1 (S538) and transmit a second short-exposed image SDT2 to the second HDR module 540 (S540).

When receiving the second long-exposed image LDT2 and the second short-exposed image SDT2, the second HDR module 540 may perform HDR processing and merging on the second long-exposed image LDT2 and the second short-exposed image SDT2 (S550), and transmit the merged image HDT to the second image signal processing module 550 (S552). The second image signal processing module 550 may perform second image processing on the merged image HDT (S560) and output a third merged image HDT3 (S562).

Figure 6A:
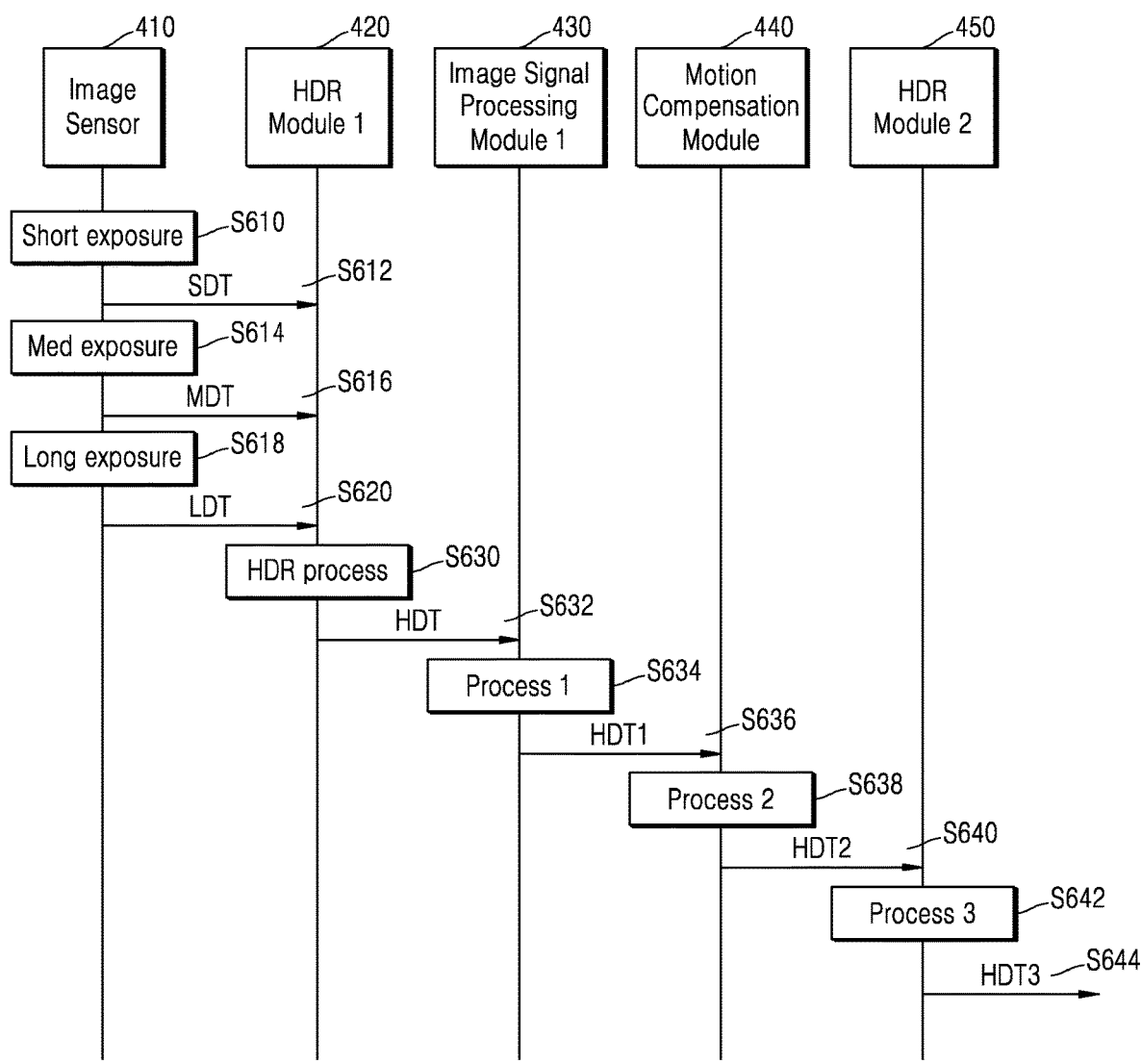
FIG. 6A is a diagram illustrating an HDR processing operation for three exposed images by an image processing system according to an example embodiment of the inventive concept.
Figure 6B:
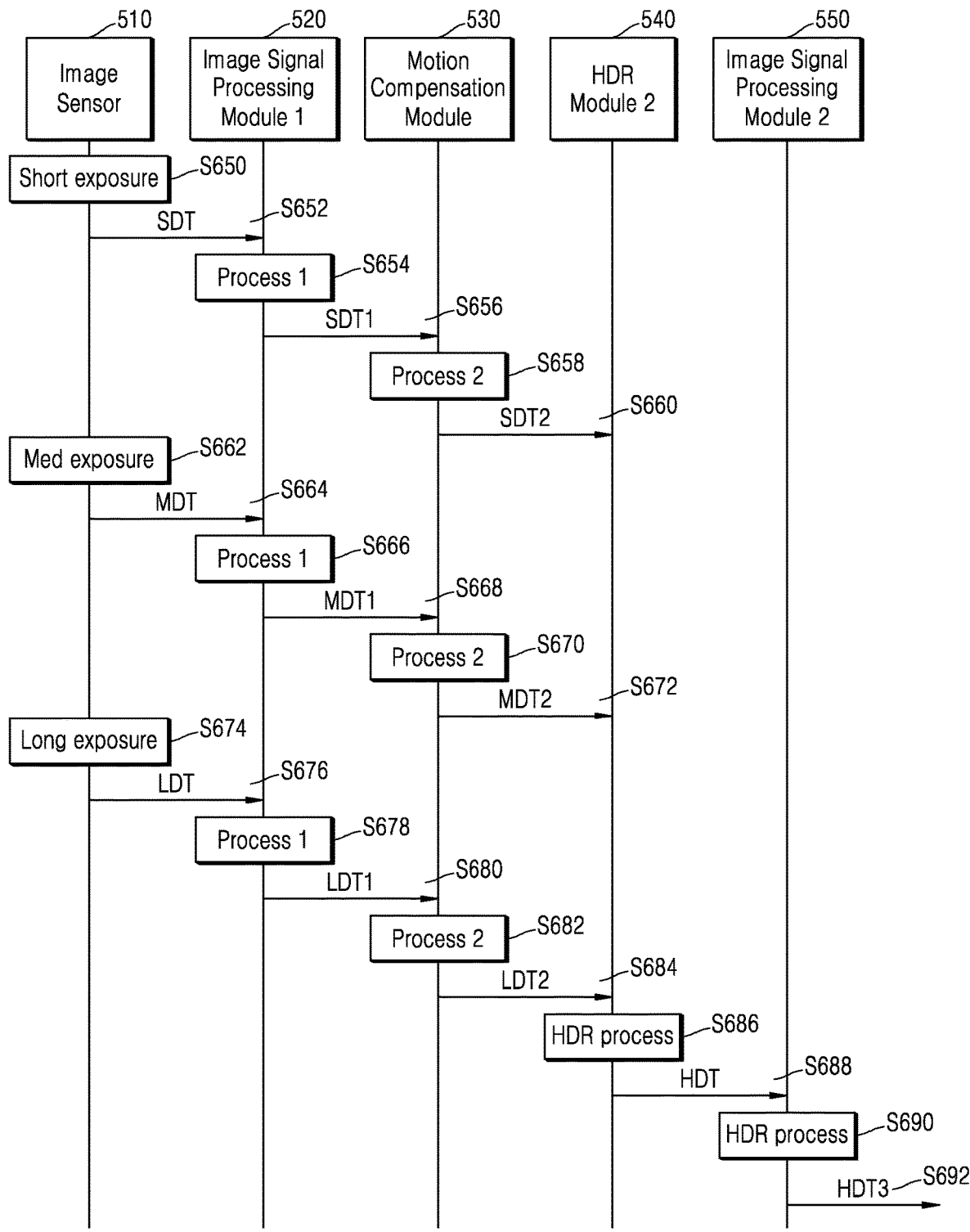
FIG. 6B is an HDR processing operation for three exposed images by an image processing system according to a comparative example.

FIG. 6A is a diagram illustrating an HDR processing operation for three exposed images by an image processing system according to an example embodiment of the inventive concept, and FIG. 6B is an HDR processing operation for three exposed images by an image processing system according to a comparative example.

FIG. 6A is a diagram illustrating an HDR processing operation for three exposed images by the image processing system described with reference to FIGS. 4A and 4B.

Referring to FIG. 6A, the image sensor 410 may generate a short-exposed image SDT (S610) and transmit the generated short-exposed image SDT to the first HDR module 420 (S612). The image sensor 410 may generate a medium-exposed image MDT (S614) and transmit the generated medium-exposed image MDT to the first HDR module 420 (S616). The image sensor 410 may generate a long-exposed image LDT (S618) and transmit the generated long-exposed image LDT to the first HDR module 420 (S620).

When receiving the short-exposed image SDT, the medium-exposed image MDT and the long-exposed image LDT, the first HDR module 420 may perform HDR processing and merging on the medium-exposed image MDT and the long-exposed image LDT and generate a merged image HDT (S630). The first HDR module 420 may transmit the generated merged image HDT to the first image signal processing module 430 (S632). The first image signal processing module 430 may perform first image processing on the received merged image HDT (S634) and transmit a first merged image HDT1 to the motion compensation module 440 (S636). The motion compensation module 440 may perform motion compensation on the first merged image HDT1 (S638) and transmit a second merged image HDT2 to the second image signal processing module 450 (S640). The second image signal processing module 450 may perform second image processing on the second merged image HDT2 (S642) and output a third merged image HDT3 (S644). In this case, the first image signal processing module 430 and the motion compensation module 440 perform image processing only on the merged image HDT, and thus, the first image signal processing module 430 and the motion compensation module 440 may perform image processing faster than when image processing is performed on each of the long-exposed image LDT, the medium-exposed image MDT, and the short-exposed image MDT before merging.

FIG. 6B is a diagram illustrating an HDR processing operation for three exposed images by the image processing system described with reference to FIGS. 5A and 5B.

The image sensor 510 may generate a short-exposed image SDT (S650) and transmit the generated short-exposed image SDT to the first image signal processing module 520 (S652). The first image signal processing module 520 may perform first image processing (S654) and transmit a generated first short-exposed image SDT1 to the motion compensation module 530 (S656). The motion compensation module 530 may perform motion compensation on the first short-exposed image SDT1 (S658) and transmit a second short-exposed image SDT2 to the second HDR module 540 (S660).

The image sensor 510 may generate a medium-exposed image MDT (S662) and transmit a generated medium-exposed image MDT to the first image signal processing module 520 (S664). The first image signal processing module 520 may perform first image processing on the medium-exposed image MDT (S666) and transmit a generated first medium-exposed image MDT1 to the motion compensation module 530 (S668). The motion compensation module 530 may perform motion compensation on the first medium-exposed image MDT1 (S670) and transmit a second medium-exposed image MDT2 to the second HDR module 540 (S672).

The image sensor 510 may generate a long-exposed image LDT (S674) and transmit the generated long-exposed image LDT to the first image signal processing module 520 (S676). The first image signal processing module 520 may perform first image processing on the long-exposed image LDT (S678) and transmit a generated first long-exposed image LDT1 to the motion compensation module 530 (S680). The motion compensation module 530 may perform motion compensation on the first long-exposed image LDT1 (S682) and transmit a second long-exposed image LDT2 to the second HDR module 540 (S684).

When receiving the second short-exposed image SDT2, the second medium-exposed image MDT2, and the second long-exposed image LDT2, the second HDR module 540 may perform HDR processing and merging on the second short-exposed image SDT2, the second medium-exposed image MDT2, and the second long-exposed image LDT2 (S686), and transmit a merged image HDT to the second image signal processing module 550 (S688). The second image signal processing module 550 may perform second image processing on the merged image HDT (S690) and output a third merged image HDT3 (S692).

Even when HDR processing is performed on three exposed images according to the method described with reference to FIG. 6A, in a case where the first HDR module 420 is used, image processing may be performed faster than the method described with reference to FIG. 6B, and thus, power consumption of the image processing system may be reduced.

Figure 7A:
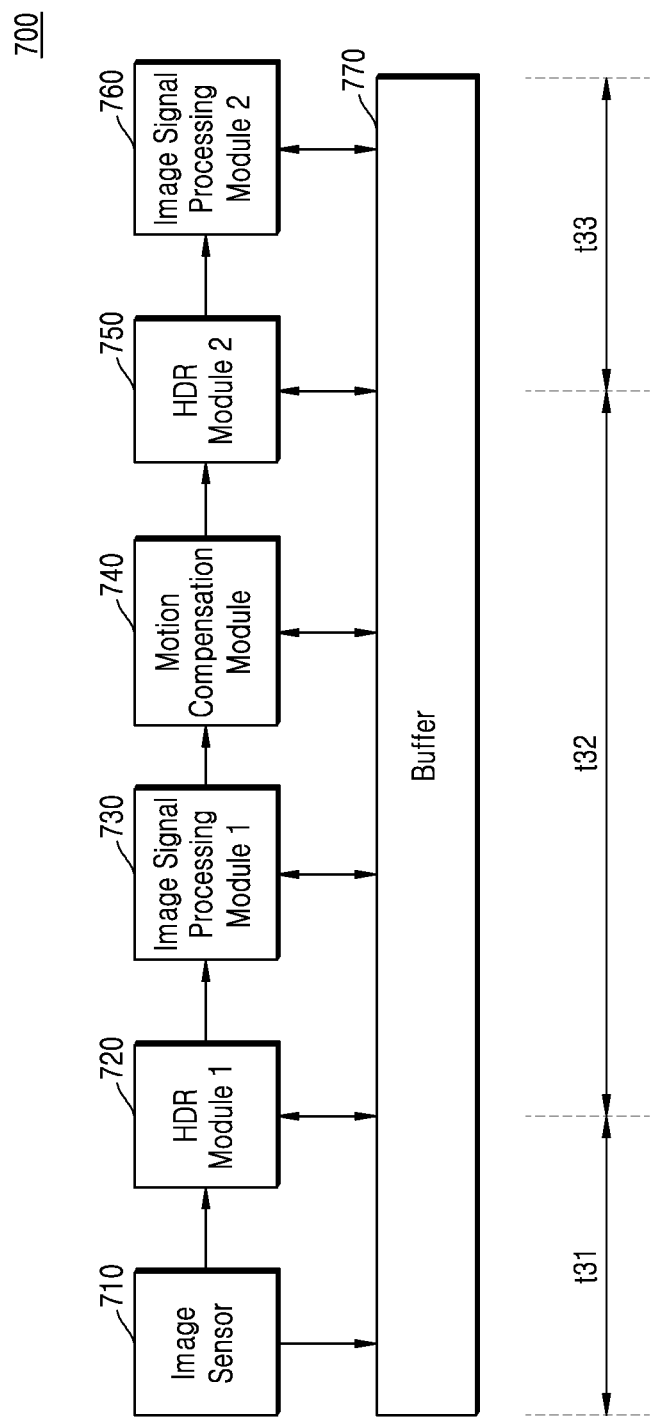
FIGS. 7A and 7B are diagrams illustrating methods of performing HDR processing in a mixed manner by an image processing system according to an example embodiment of the inventive concept.
Figure 7B:
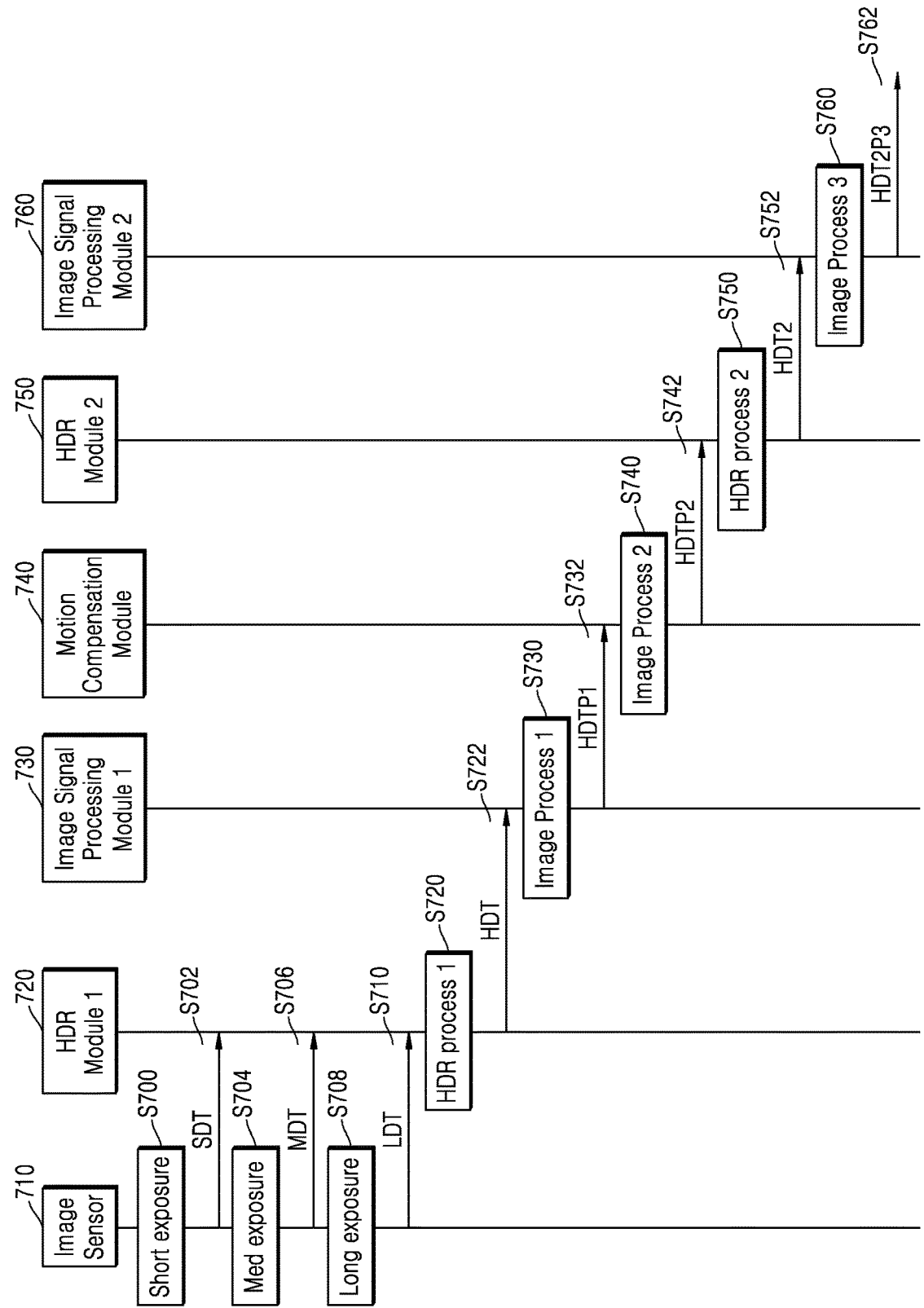

FIGS. 7A and 7B are diagrams illustrating a method of performing HDR processing in a mixed manner by using an image processing system according to an example embodiment of the inventive concept.

When HDR processing is performed on three or more exposed images, the first HDR processing module may first perform HDR processing and merging because there is a relatively small movement difference between a short-exposed image and a medium-exposed image and an imaging time interval between the captured images is short, and a long-exposed image is expected to have a relatively long imaging time interval. Thus, motion compensation may be performed, and HDR processing and merging may be performed by a second HDR processing module.

Referring to FIG. 7A, an image processing system 700 may include an image sensor 710, a first HDR module 720, a first image signal processing module 730, a motion compensation module 740, a second HDR module 75, a second image signal processing module 760, and a buffer 770.

Referring to FIG. 7B, the image sensor 710 may generate a short-exposed image SDT (S700) and transmit the generated short-exposed image SDT to the first HDR module 720 (S702). The image sensor 710 may generate a medium-exposed image MDT (S704) and transmit the generated medium-exposed image MDT to the first HDR module 720 (S706). The image sensor 710 may generate a long-exposed image LDT (S708) and transmit the generated long-exposed image LDT to the first HDR module 720 (S710). The long-exposed image LDT may pass through the first HDR module 720 without additional processing or may be directly transferred to the first image signal processing module 730.

The first HDR module 720 may first perform HDR processing and merging only on the short-exposed image SDT and the medium-exposed image MDT and generate a merged image HDT (S720). The first HDR module 720 may transmit the generated merged image HDT and the long-exposed image to the first image signal processing module 730 (S722). The first image signal processing module 730 may perform first image processing on the received merged image HDT and the received long-exposed image LDT (S730), and transmit first processing data HDTP1 including a first merged image and a first long-exposed image to the motion compensation module 740 (S732).

The motion compensation module 740 may perform motion compensation on the first merged image and the first long-exposed image to generate a motion-compensated merged image and a motion-compensated long-exposed image (S740), and transmit second processing data HDTP2 including the motion-compensated merged image and the motion-compensated long-exposed image to the second HDR module 750 (S742).

The second HDR module 750 may perform HDR processing and merging on the motion-compensated merged image and the motion-compensated long-exposed image, and generate second merged data HDT2 (S750). The second HDR module 750 may transmit the second merged data HDT2 to the second image signal processing module 760 (S752). The second image signal processing module 760 may perform second image processing (S760) and output a third merged image HDT2P3 (762).

In an embodiment, the image processing system 700 may perform HDR processing on a short-exposed image and a medium-exposed image before motion compensation and perform HDR processing on a long-exposed image having a long imaging interval and a large motion after the motion compensation, and thus, effective HDR processing may be performed.

Figure 8:
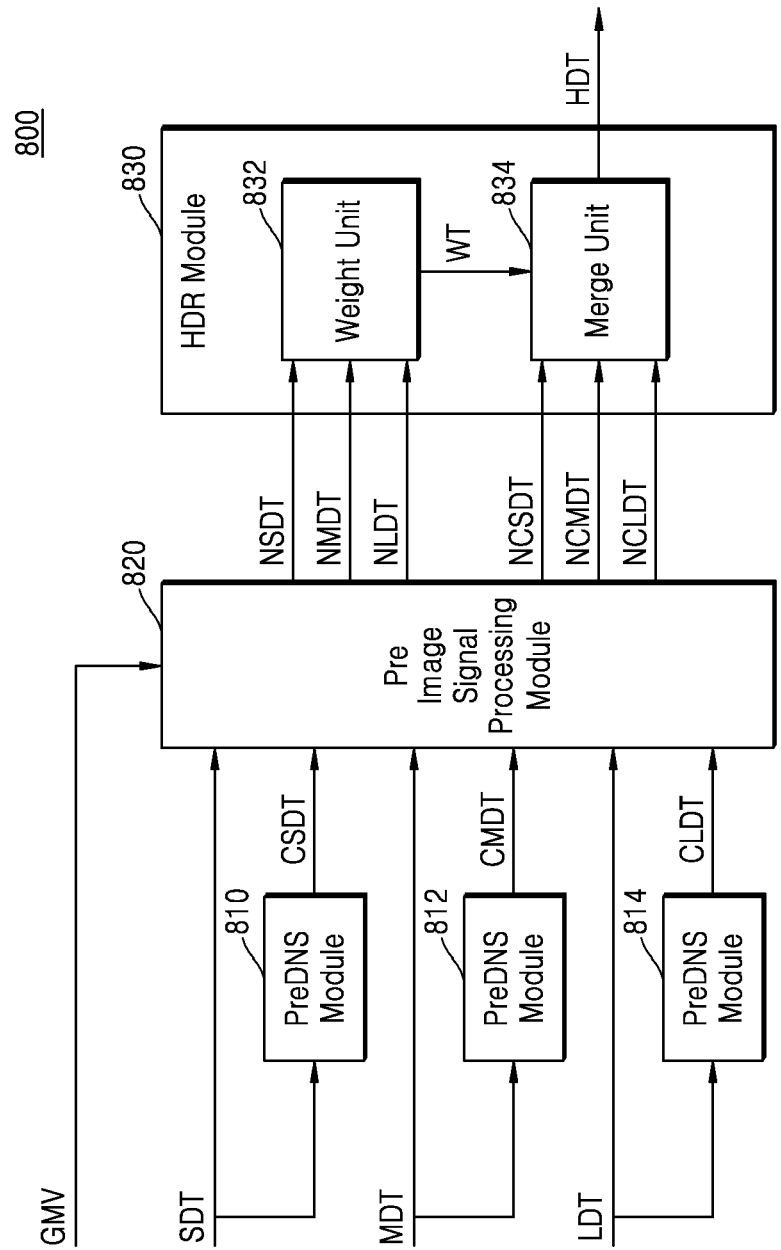
FIG. 8 is a diagram illustrating an image processing method according to an example embodiment of the inventive concept.

FIG. 8 is a diagram illustrating an image processing method according to an example embodiment of the inventive concept.

FIG. 8 illustrates a detailed operation of the pre-processor 110 including the HDR module illustrated in FIG. 2 according to an embodiment of the inventive concept. Referring to FIG. 8, an image processing system 800 may include a first pre-denoise module 810, a second pre-denoise module 812, a third pre-denoise module 814, a pre-image signal processing module 820, and an HDR module 830. The HDR module 830 may include a weight unit 832 and a merge unit 834.

The first pre-denoise module 810 may receive the short-exposed image SDT to generate a clean short-exposed image CSDT from which noise is removed, the second pre-denoise module 812 may receive the medium-exposed image MDT to generate a clean medium-exposed image CMDT, and the third pre-denoise module 814 may receive the long-exposed image LDT to generate a clean long-exposed image CLDT. For example, the received exposed images may include Bayer pattern images.

The pre-image signal processing module 820 may receive the short-exposed image SDT, the clean short-exposed image CSDT, the medium-exposed image MDT, the clean medium-exposed image CMDT, the long-exposed image LDT, and the clean long-exposed image LDT, and perform normalization according to an exposure level. The pre-image signal processing module 820 may perform motion compensation according to movement of a camera module based on global motion vector information (GMV). The pre-image signal processing module 820 may further include a normalization module for performing normalization and a motion compensation module for performing motion compensation.

The weight unit 832 may calculate a weight value WT of each image based on information of a normalized short-exposed image NSDT, a normalized medium-exposed image NMDT, and a normalized long-exposed image NLDT. The information for calculating the weight value WT may include motion mismatch information of an image, a radial motion grade, and an intensity score.

The merge unit 834 may generate a merged image HDT by merging a normalized clean short-exposed image NCSDT, a normalized clean medium-exposed image NCMDT, and a normalized clean long-exposed image NCLDT, based on the weight value WT of each image calculated by the weight unit 832.

Even when the received exposed image is an RGB-W pattern image rather than a Bayer pattern image, images may be processed by sharing hardware. For example, RGB data may be received instead of the short-exposed image SDT to be processed, and W data may be received instead of the long-exposed image LDT to be processed. Descriptions thereof are given in detail with reference to FIG. 9.

Figure 9:
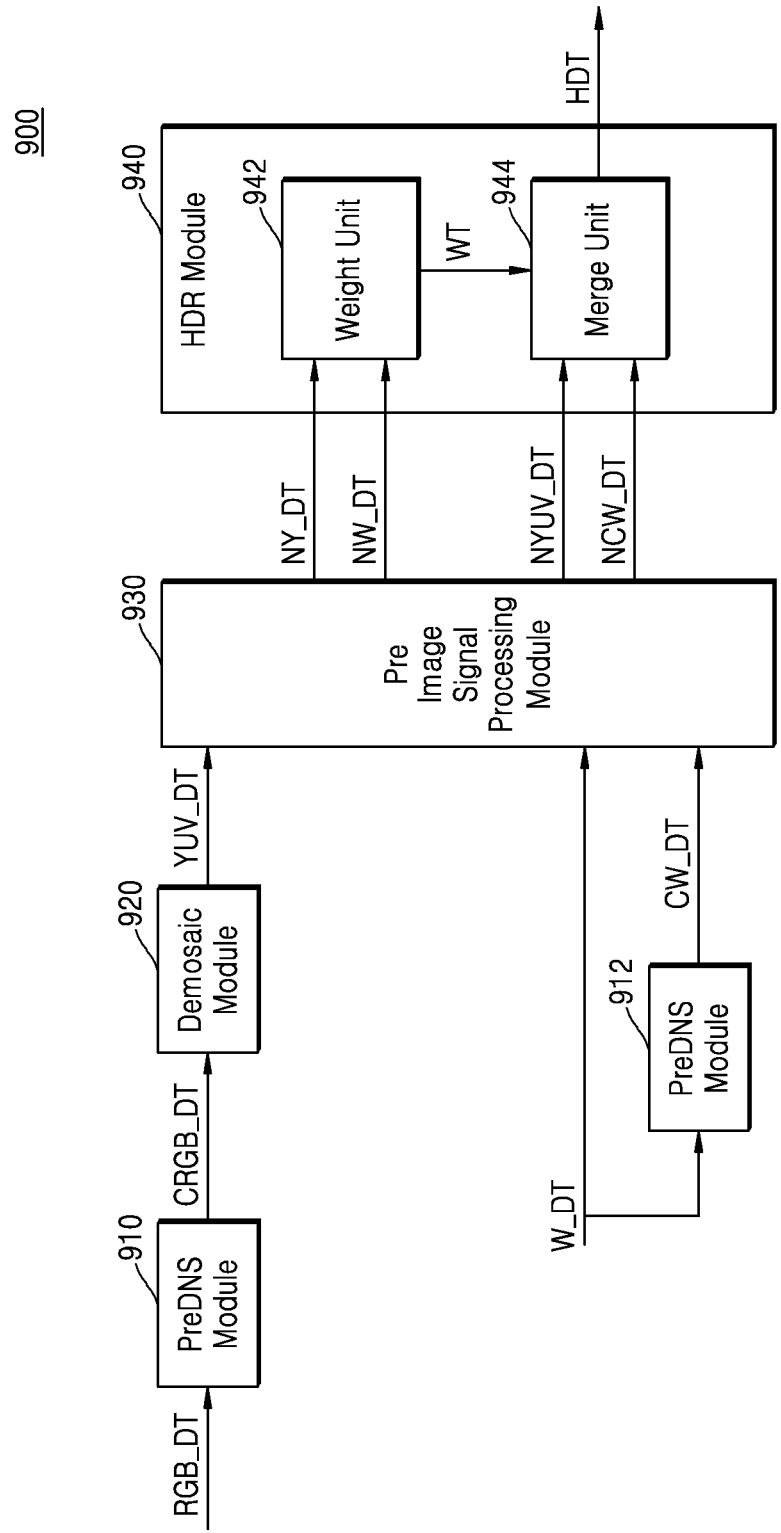
FIG. 9 is a diagram illustrating an HDR processing method for an RGB-W image among image processing methods according to an example embodiment of the inventive concept.

FIG. 9 is a diagram illustrating an HDR processing method for an RGB-W image among image processing methods, according to an example embodiment of the inventive concept.

FIG. 9 is a diagram illustrating a process of using the image processing system 800 described with reference to FIG. 8 for another pattern image including an RGB-W pattern image. Referring to FIG. 9, an image processing system 900 may include a first pre-denoise module 910, a second pre-denoise module 912, a pre-image signal processing module 930, and an HDR module 940, and the HDR module 940 may include a weight unit 942 and a merge unit 944. For convenience of explanation, a further description of components and technical aspects previously described with reference to FIG. 8 is omitted.

The image processing system 900 may further include a demosaic module 920.

When the received image data is an RGB-W pattern image, the demosaic module 920 may perform demosaic processing on the image data and generate YUV data YUV_DT.

The first pre-denoise module 910 may receive RGB data RGB_DT, perform noise processing on the RGB data, and generate clean RGB data CRGB_DT.

The second pre-denoise module 912 may receive W data W_DT, perform noise processing, and generate clean W data CW_DT.

The weight unit 942 may receive normalized Y data NY_DT and normalized W data NW_DT and calculate a weight value WT of each image.

The merge unit 944 may generate a merged image HDT based on normalized clean YUV data NYUV_DT and normalized clean W data NCW_DT.

The image processing system 900 may process image data by sharing hardware for HDR processing even when an input image does not have a Bayer pattern.

Figure 10:
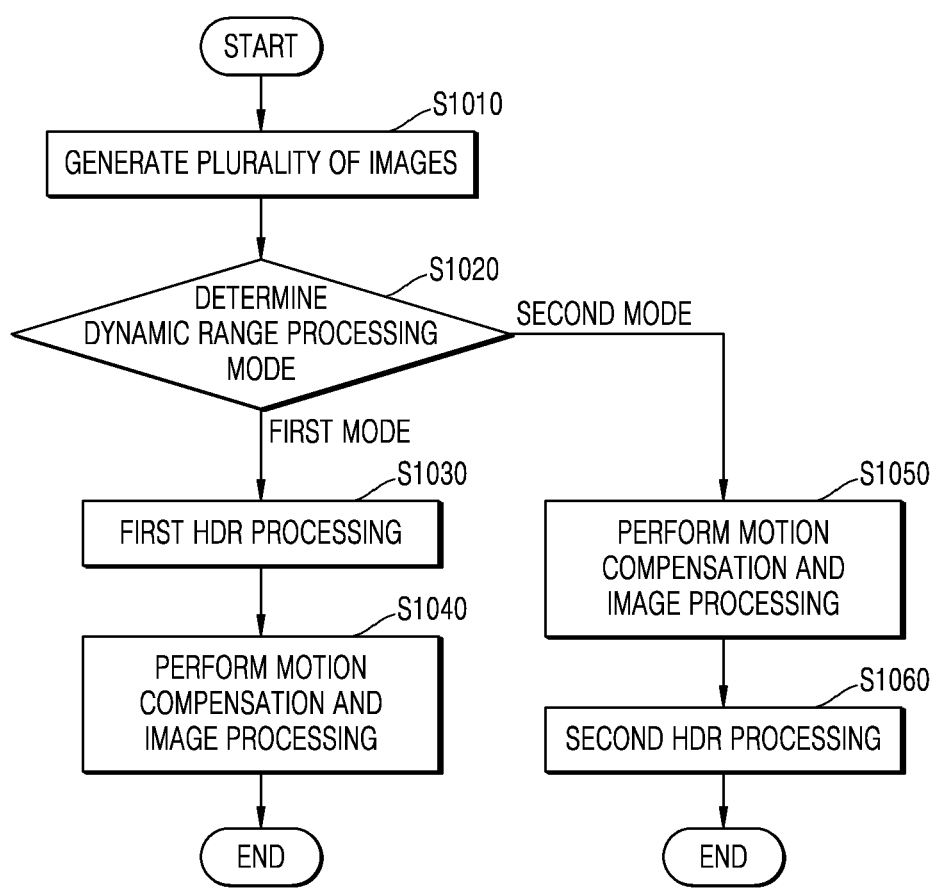
FIG. 10 is a flowchart illustrating an image processing method according to an example embodiment of the inventive concept.

FIG. 10 is a flowchart illustrating an image processing method according to an example embodiment of the inventive concept.

An image processing system may generate a plurality of images through an image sensor (S1010). The image sensor may capture an image in a staggered manner or an auto exposure bracketing manner. However, the image sensor is not limited thereto, and various manners may be used by the image sensor to capture in an image. The image processing system may generate a Bayer pattern image and an RGB-W pattern image. However, the image processing system is not limited thereto, and may process various pattern images.

The image processing system may determine a dynamic range processing mode based on the received image information (S1020). The dynamic range processing mode may include a first mode in which a plurality of images are merged before motion compensation processing is performed, and a second mode in which a plurality of images are merged after the motion compensation processing is performed. The image processing system may process a plurality of images in the first mode when an imaging time interval is short or a motion is small, and may process the plurality of images in the second mode when the imaging time interval is long or the motion is large.

The image processing system may first perform HDR processing on a plurality of images in the first mode (S1030). The image processing system may perform simple noise processing or motion compensation in the first mode before HDR processing is performed.

The image processing system may perform motion compensation and the remaining image processing after the HDR processing is performed (S1040). In this case, the image processing may include various types of processing such as, for example, processing for image quality improvement such as noise removal, brightness adjustment, and sharpness adjustment, image processing (for example, converting Bayer pattern image data into YUV format data or RGB format data) for changing image size and data format, etc.

The image processing system may first perform image processing including motion compensation in the second mode (S1050). The image processing system may perform motion compensation and image processing and may perform HDR processing and merging on a plurality of images (S1060).

Figure 11A:
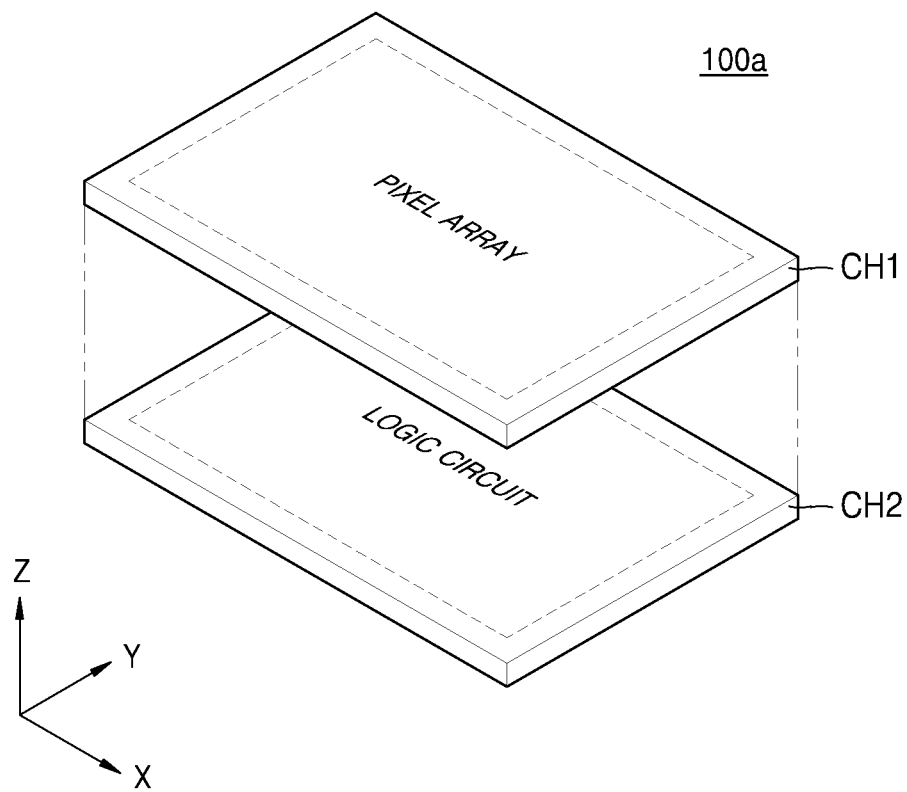
FIG. 11A is an exploded perspective view of an image sensor.
Figure 11B:
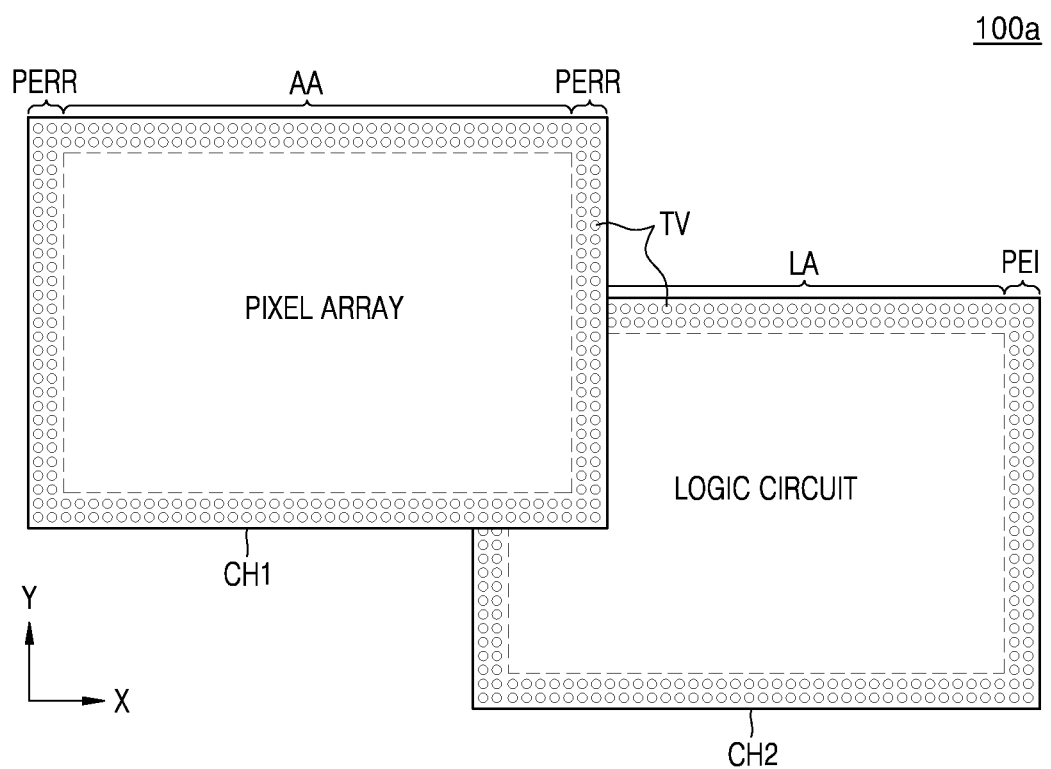
FIG. 11B is a plan view of the image sensor, according to an example embodiment of the inventive concept.

FIG. 11A is an exploded perspective view of an image sensor, and FIG. 11B is a plan view of the image sensor, according to an example embodiment of the inventive concept.

Referring to FIGS. 11A and 11B, an image sensor 100a may have a structure in which a first chip CH1 and a second chip CH2 are stacked. The pixel array 120 of FIG. 2 may be formed in the first chip CH1, and a logic circuit including, for example, a row driver, the readout circuit 130, a ramp signal generator, and a timing controller may be formed in the second chip CH2.

As illustrated in FIG. 11B, the first chip CH1 may include an active region AA in the central portion thereof and a peripheral region PERR at the edge thereof, and the second chip CH2 may include a logic region LA in the central portion thereof and a peripheral region PEI at the edge thereof. A plurality of pixels PX may be arranged in the active region AA of the first chip CH1 in a two-dimensional array structure. A logic circuit may be disposed in the logic region LA of the second chip CH2.

Through-vias TV extending in a third direction (a Z direction) may be formed in the peripheral regions PERR and PEI of the first chip CH1 and the second chip CH2. The first chip CH1 may be electrically coupled to the second chip CH2 through the through-vias TV. Lines extending in a first direction (an X direction) or a second direction (a Y direction) and vertical contacts may be further formed in the peripheral region PERR of the first chip CH1. Multiple lines extending in the first direction (the X direction) and the second direction (the Y direction) may also be formed in a wiring layer of the second chip CH2, and the lines may be connected to the logic circuit.

Although a structure in which the first chip CH1 is electrically coupled to the second chip CH2 through the through-vias TV is described, embodiments of the inventive concept are not limited thereto. For example, according to embodiments, the first chip CH1 and the second chip CH2 may have various bonding structures, such as Cu—Cu bonding, bonding of a through-via and a Cu pad, bonding of a through-via and an external connection terminal, and bonding through an integrated through-via.

Figure 12:
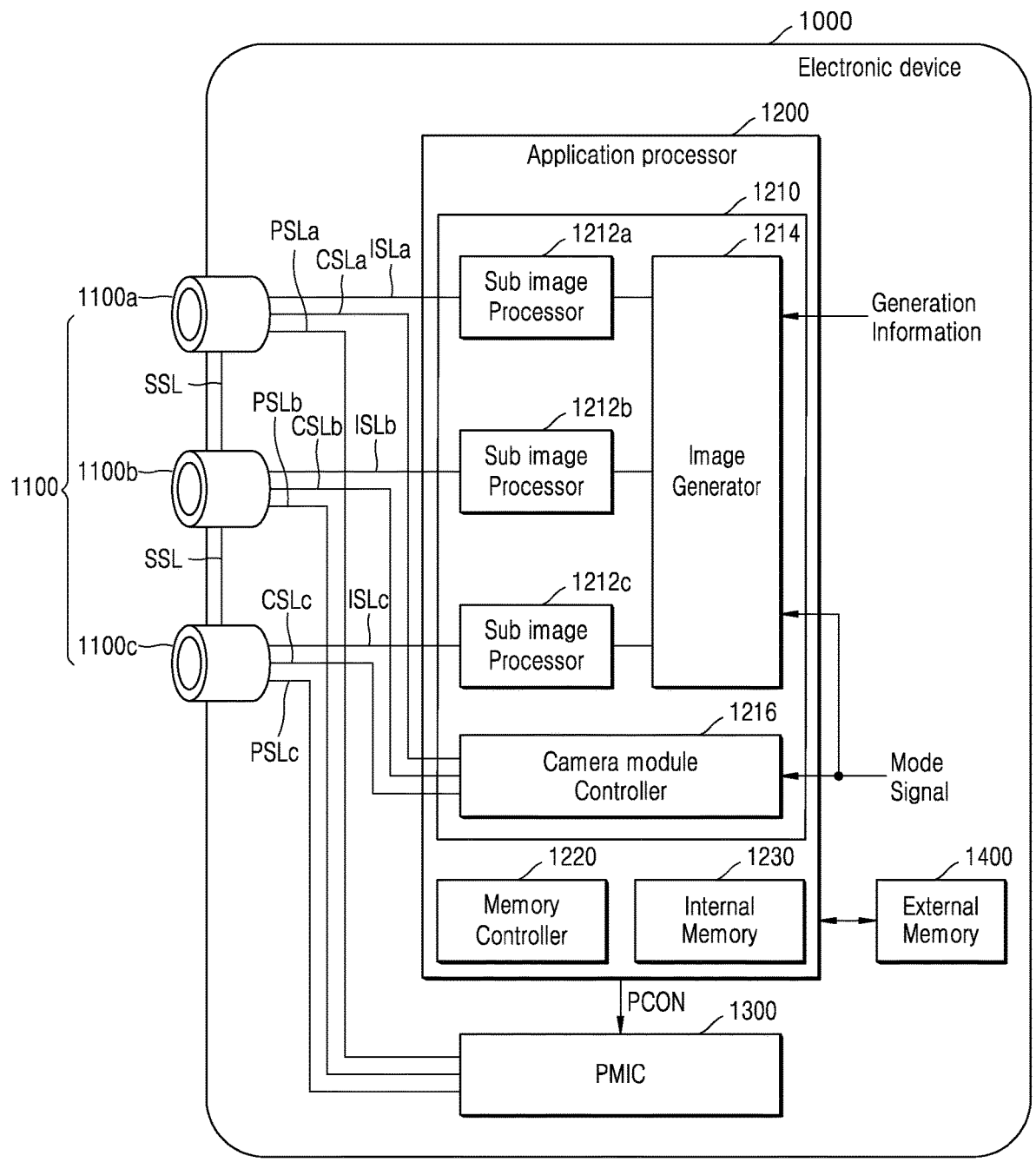
FIG. 12 is a block diagram of an electronic device including a multi-camera module according to an example embodiment of the inventive concept.
Figure 13:
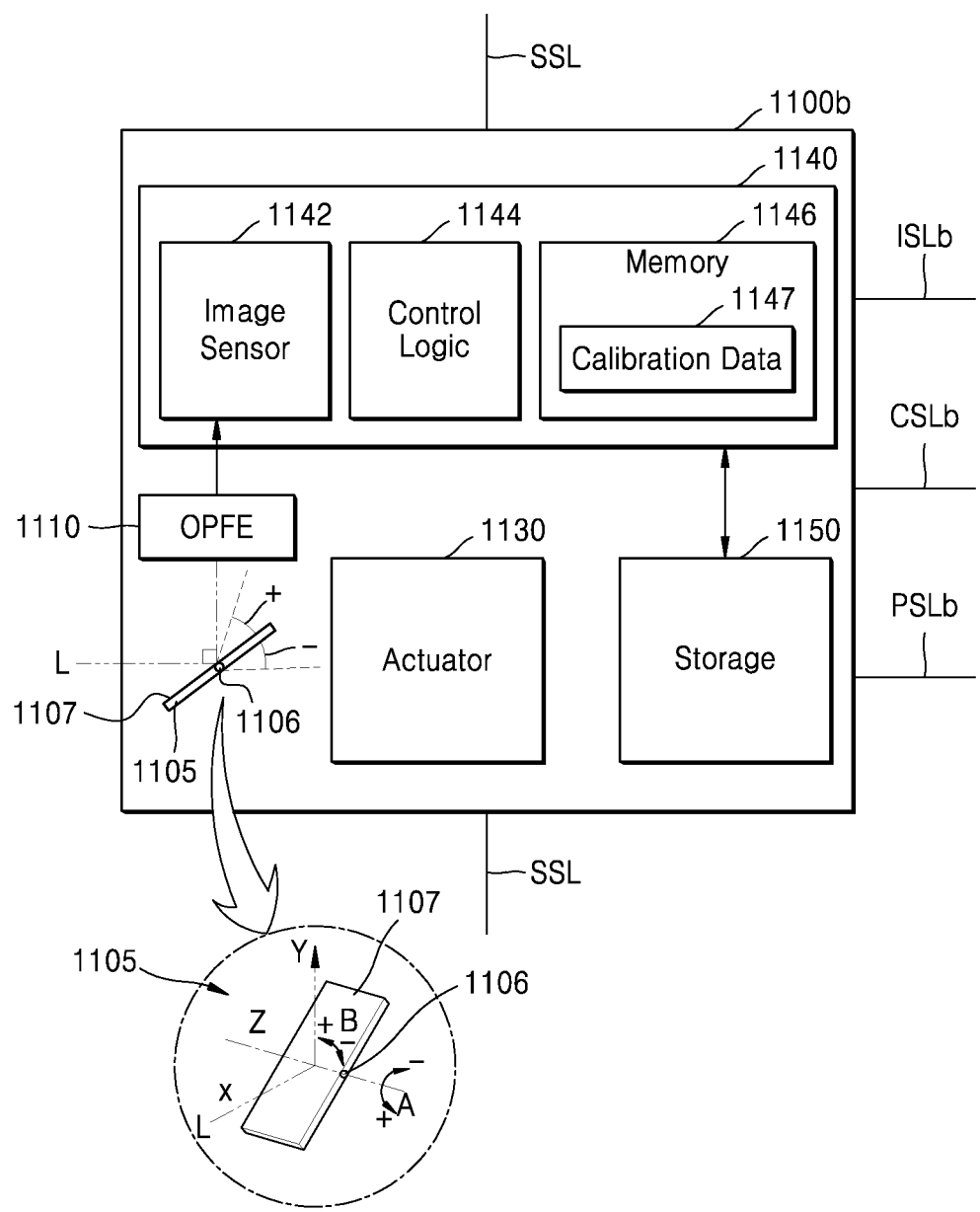
FIG. 13 is a detailed diagram of a camera module of FIG. 12 according to an example embodiment of the inventive concept.

FIG. 12 is a block diagram of an electronic device including a multi-camera module according to an example embodiment of the inventive concept. FIG. 13 is a detailed block diagram of the multi-camera module illustrated in FIG. 12 according to an example embodiment of the inventive concept.

Referring to FIG. 12, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although FIG. 12 illustrates an embodiment including three camera modules 1100a, 1100b, and 1100c, embodiments are not limited thereto. For example, in some embodiments, the camera module group 1100 may be modified to include only two camera modules. In addition, in some embodiments, the camera module group 1100 may be modified to include k (where k is a natural number greater than or equal to 4) camera modules.

Hereinafter, a detailed configuration of the camera module 1100b is described in more detail with reference to FIG. 13, and the following description may be equally applied to the other camera modules 1100a and 1100b according to an embodiment.

Referring to FIG. 13, the camera module 1100b includes a prism 1105, an optical path folding element (OPFE) 1110, an actuator 1130, an image sensing device 1140, and a storage 1150.

The prism 1105 may include a reflective surface 1107 of a light reflective material to change a path of light L incident from outside of the camera module 1100b.

In some embodiments, the prism 1105 may change the path of the light L incident in the first direction X to the second direction Y perpendicular to the first direction X. In addition, the prism 1105 may rotate the reflective surface 1107 of the light reflective material in an A direction about a central axis 1106 or rotate the central axis 1106 in a B direction to change a path of the incident light L in the first direction X to the second direction Y perpendicular to the first direction X. In this case, the OPFE 1110 may also move in a third direction Z perpendicular to the first direction X and the second direction Y.

In some embodiments, as illustrated in FIG. 13, the largest rotation angle of the prism 1105 in the A direction may be about 15 degrees or less in a +A direction and greater than about 15 degrees in a-A direction. However, embodiments of the inventive concept are not limited thereto.

In some embodiments, the prism 1105 is rotatable in the +B direction or the −B direction by about 20 degrees, or by about 10 degrees to about 20 degrees, or by about 15 degrees to about 20 degrees, where angles of rotation may be about equal to each other in the +B direction or the −B direction, or may be nearly similar within a range of about 1 degree.

In some embodiments, the prism 1105 may rotate the reflective surface 1107 of the light reflective material in a third direction (for example, the Z direction) parallel to an extension direction of the central axis 1106.

The OPFE 1110 may include m (where m is a natural number) optical lenses. The m optical lenses may move in the second direction Y to change an optical zoom ratio of the camera module 1100b. For example, in a case in which a basic optical zoom magnification of the camera module 1100b is referred to as Z, when the m optical lenses included in the OPFE 1110 are moved, the optical zoom magnification of the camera module 1100b may be changed to 3Z, 5Z, or an optical zoom magnification greater than 5Z.

The actuator 1130 may move the OPFE 1110 or the optical lenses (hereinafter, referred to as an optical lens) to a preset position. For example, the actuator 1130 may adjust a position of the optical lens such that the image sensor 1142 is at a focal length of the optical lens for accurate sensing.

The image sensing device 1140 may include an image sensor 1142, a control logic 1144, and a memory 1146. The image sensor 1142 may sense an image of a sensing target by using the light L provided through an optical lens. The image sensor 1142 may generate image data having a high operating range by merging HCG image data with LCG image data.

The control logic 1144 may control all operations of the camera module 1100b. For example, the control logic 1144 may control an operation of the camera module 1100b according to a control signal provided through a control signal line CSLb.

The memory 1146 may store information utilized for the operation of the camera module 1100b, such as calibration data 1147. The calibration data 1147 may include information utilized for the camera module 1100b to generate image data by using the light L provided from outside of the camera module 1100b. The calibration data 1147 may include, for example, information on the degree of rotation described above, information on a focal length, information on an optical axis, etc. When the camera module 1100b is implemented in the form of a multi-state camera in which a focal length is changed according to a position of an optical lens, the calibration data 1147 may include a focal length value for each position (or state) of the optical lens and information on auto focusing.

The storage 1150 may store image data sensed by the image sensor 1142. The storage 1150 may be outside the image sensing device 1140 and may be implemented in a stacked form with a sensor chip constituting the image sensing device 1140. In some embodiments, the storage 1150 may include electrically erasable programmable read-only memory (EEPROM). However, the storage 1150 is not limited thereto.

Referring to FIGS. 12 and 13, in some embodiments, each of the plurality of camera modules 1100a, 1100b, and 1100c may include the actuator 1130. Accordingly, each of the plurality of camera modules 1100a, 1100b, and 1100c may include the same or different calibration data 1147 according to an operation of the actuator 1130 included therein.

In some embodiments, one camera module (for example, 1100b) of the plurality of camera modules 1100a, 1100b, and 1100c is a folded-lens-type camera module including the prism 1105 and the OPFE 1110 described above, and the other camera modules (for example, 1100a and 1100b) may be vertical camera modules that do not include the prism 1105 and the OPFE 1110. However, embodiments of the inventive concept are not limited thereto.

In some embodiments, one camera module (for example, 1100c) among the plurality of camera modules 1100a, 1100b, and 1100c may include, for example, a vertical depth camera that extracts depth information by using infrared (IR). In this case, the application processor 1200 may generate a three-dimensional (3D) depth image by merging image data provided from the depth camera with image data provided from another camera module (for example, 1100a or 1100b).

In some embodiments, at least two camera modules (for example, 1100a and 1100b) among the plurality of camera modules 1100a, 1100b, and 1100c may have different fields of view (viewing angles). In this case, for example, optical lenses of at least two camera modules (for example, 1100a and 1100b) among the plurality of camera modules 1100a, 1100b, and 1100c may be different from each other, but are not limited thereto.

In addition, in some embodiments, the plurality of camera modules 1100a, 1100b, and 1100c may respectively have different viewing angles. In this case, optical lenses included in each of the plurality of camera modules 1100a, 1100b, and 1100c may also be different from each other, but are not limited thereto.

In some embodiments, the plurality of camera modules 1100a, 1100b, and 1100c may be physically separated from each other. That is, in some embodiments, the plurality of camera modules 1100a, 1100b, and 1100c do not divide a sensing region of one image sensor 1142, and an independent image sensor 1142 may be included in each of the plurality of camera modules 1100a, 1100b, and 1100c.

Referring back to FIG. 12, the application processor 1200 may include an image processing device 1210, a memory controller 1220, and an internal memory 1230. The application processor 1200 may be separated from the plurality of camera modules 1100a, 1100b, and 1100c. For example, the application processor 1200 may be implemented as one semiconductor chip, and the plurality of camera modules 1100a, 1100b, and 1100c may be implemented as another semiconductor chip.

The image processing device 1210 may include a plurality of sub image processors 1212a, 1212b, and 1212c, an image generator 1214, and a camera module controller 1216.

The image processing device 1210 may include a plurality of sub image processors 1212a, 1212b, and 1212c respectively corresponding to the plurality of camera modules 1100a, 1100b, and 1100c.

Image data generated by the camera modules 1100a, 1100b, and 1100c may be provided to the corresponding sub image processors 1212a, 1212b, and 1212c through image signal lines ISLa, ISLb, and ISLc separated from each other. For example, the image data generated by the camera module 1100a may be provided to the sub image processor 1212a through the image signal line ISLa, the image data generated by the camera module 1100b may be provided to the sub image processor 1212b through the image signal line ISLb, and the image data generated by the camera module 1100c may be provided to the sub image processor 1212c through the image signal line ISLc. The image data may be transmitted by using, for example, a camera serial interface (CSI) based on a MIPI. However, embodiments of the inventive concept are not limited thereto.

In addition, in some embodiments, one sub image processor may correspond to a plurality of camera modules. For example, in some embodiments, the sub image processor 1212a and the sub image processor 1212c are not separated from each other as illustrated in FIG. 12 and may be integrated into one sub image processor, and the image data provided from the camera module 1100a and the image data provided from the camera module 1100c may be selected by a selection device (for example, a multiplexer) and then provided to the integrated sub image processor.

The image data provided to each of the sub image processors 1212a, 1212b, and 1212c may be provided to the image generator 1214. The image generator 1214 may generate an output image by using the image data provided from each of the sub image processors 1212a, 1212b, and 1212c according to image generation information or a mode signal.

For example, the image generator 1214 may generate an output image by merging at least part of the image data generated by the camera modules 1100a, 1100b, and 1100c having different viewing angles according to image generation information or a mode signal. In addition, the image generator 1214 may generate an output image by selecting any one of the image data generated by the camera modules 1100a, 1100b, and 1100c having different viewing angles according to image generation information or a mode signal.

In some embodiments, the image generation information may include a zoom signal or zoom factor. In addition, in some embodiments, the mode signal may be, for example, a signal based on a mode selected by a user.

When the image generation information is a zoom signal (zoom factor) and the camera modules 1100a, 1100b, and 1100c have different fields of view (viewing angles), the image generator 1214 may perform different operations depending on the type of the zoom signal. For example, when the zoom signal is a first signal, the image generator 1214 may merge the image data output from the camera module 1100a with the image data output from the camera module 1100c, and then generate an output image by using the merged image data and the image data output from the camera module 1100b that is not used for merging. If the zoom signal is a second signal different from the first signal, the image generator 1214 may an output image by selecting any one of the image data output from the respective camera modules 1100a, 1100b, and 1100c without performing the image data merging. However, embodiments are not limited thereto, and a method of processing image data may be modified to be implemented in a variety of manners.

In some embodiments, the image generator 1214 may generate merged image data with an increased dynamic range by receiving a plurality of image data having different exposure times from at least one of the plurality of sub image processors 1212a, 1212b, and 1212c, and performing HDR processing on the plurality of pieces of image data.

The plurality of sub image processors 1212a, 1212b, and 1212c may each include the HDR module or the first HDR module described with reference to FIGS. 1 to 10. The image generator 1214 may receive HDR-processed image data from at least one of the plurality of sub image processors 1212a, 1212b, and 1212c and perform another image processing operation.

The camera module controller 1216 may provide control signals to the camera modules 1100a, 1100b, and 1100c. The control signals generated by the camera module controller 1216 may be respectively provided to the camera modules 1100a, 1100b, and 1100c through corresponding control signal lines CSLa, CSLb, and CSLc separated from each other.

Any one of the plurality of camera modules 1100a, 1100b, and 1100c may be designated as a master camera module (for example, 1100b) according to image generation information or a mode signal including a zoom signal, and the other camera modules (for example, 1100a and 1100c) may be designated as slave camera modules. Such information may be included in the control signals to be provided to the corresponding camera modules 1100a, 1100b, and 1100c through the control signal lines CSLa, CSLb, and CSLc separated from each other.

The camera modules operating as a master camera module and a slave camera module may be changed according to a zoom factor or an operation mode signal. For example, when a viewing angle of the camera module 1100a is wider than a viewing angle of the camera module 1100b and a zoom factor thereof indicates a low zoom magnification, the camera module 1100b operates as the master camera module, and the camera module 1100a operates as the slave camera module. In contrast, when the zoom factor thereof indicates a high zoom magnification, the camera module 1100a may operate as the master camera module and the camera module 1100b may operate as the slave camera module.

In some embodiments, the control signals provided from the camera module controller 1216 to the camera modules 1100a, 1100b, and 1100c may each include a sync enable signal. For example, when the camera module 1100b is a master camera module and the camera modules 1100a and 1100c are slave camera modules, the camera module controller 1216 may transmit a sync enable signal to the camera module 1100b. The camera module 1100b receiving the sync enable signal may generate a sync signal based on the received sync enable signal, and transmit the generated sync signal to the camera modules 1100a and 1100c through sync signal lines SSL. The camera module 1100b and the camera modules 1100a and 1100c may be synchronized with the sync signal and transmit image data to the application processor 1200.

In some embodiments, the control signals provided from the camera module controller 1216 to the plurality of camera modules 1100a, 1100b, and 1100c may include mode information according to a mode signal. The plurality of camera modules 1100a, 1100b, and 1100c may operate in a first operation mode and a second operation mode in relation to a sensing speed, based on the mode information.

The plurality of camera modules 1100a, 1100b, and 1100c may each generate (for example, generate an image signal of a first frame rate) an image signal at a first speed in the first operation mode to encode (for example, encode the image signal of a second frame rate higher than the first frame rate) the image signal at a second speed higher than the first speed, and transmit the encoded image signal to the application processor 1200. In this case, the second speed may be about 30 times the first speed or less.

The application processor 1200 may store the received image signal, that is, the encoded image signal, in the memory 1230 included therein or in the external memory 1400 disposed outside the application processor 1200, and then read out the encoded image signal from the memory 1230 or the external memory 1400, decode the encoded image signal, and display image data generated based on the decoded image signal. For example, a corresponding sub image processor among the plurality of sub image processors 1212a, 1212b, and 1212c of the image processing device 1210 may perform decoding and may also perform image processing on the decoded image signal.

The plurality of camera modules 1100a, 1100b, and 1100c may generate (for example, generate an image signal of a third frame rate lower than the first frame rate) an image signal at a third speed lower than the first speed in the second operation mode, and transmit the image signal to the application processor 1200. The image signal provided to the application processor 1200 may be an unencoded signal. The application processor 1200 may perform image processing on the received image signal or store the image signal in the memory 1230 or the external memory 1400.

The PMIC 1300 may supply power, for example, a power supply voltage, to each of the plurality of camera modules 1100a, 1100b, and 1100c. For example, the PMIC 1300 may supply first power to the camera module 1100a through a power signal line PSLa, supply second power to the camera module 1100b through a power signal line PSLa, and supply third power to the camera module 1100c through the power signal line PSLc, under the control of the application processor 1200.

The PMIC 1300 may generate power corresponding to each of the plurality of camera modules 1100a, 1100b, and 1100c in response to a power control signal PCON from the application processor 1200, and also adjust levels of the power. The power control signal PCON may include a power adjustment signal for each operation mode of the plurality of camera modules 1100a, 1100b, and 1100c. For example, the operation mode may include a low power mode, and in this case, the power control signal PCON may include information on a camera module operating in a low power mode and set levels of power. The levels of power provided to the plurality of camera modules 1100a, 1100b, and 1100c may be equal to or different from each other. In addition, the levels of power may be changed dynamically.

Figure 14:
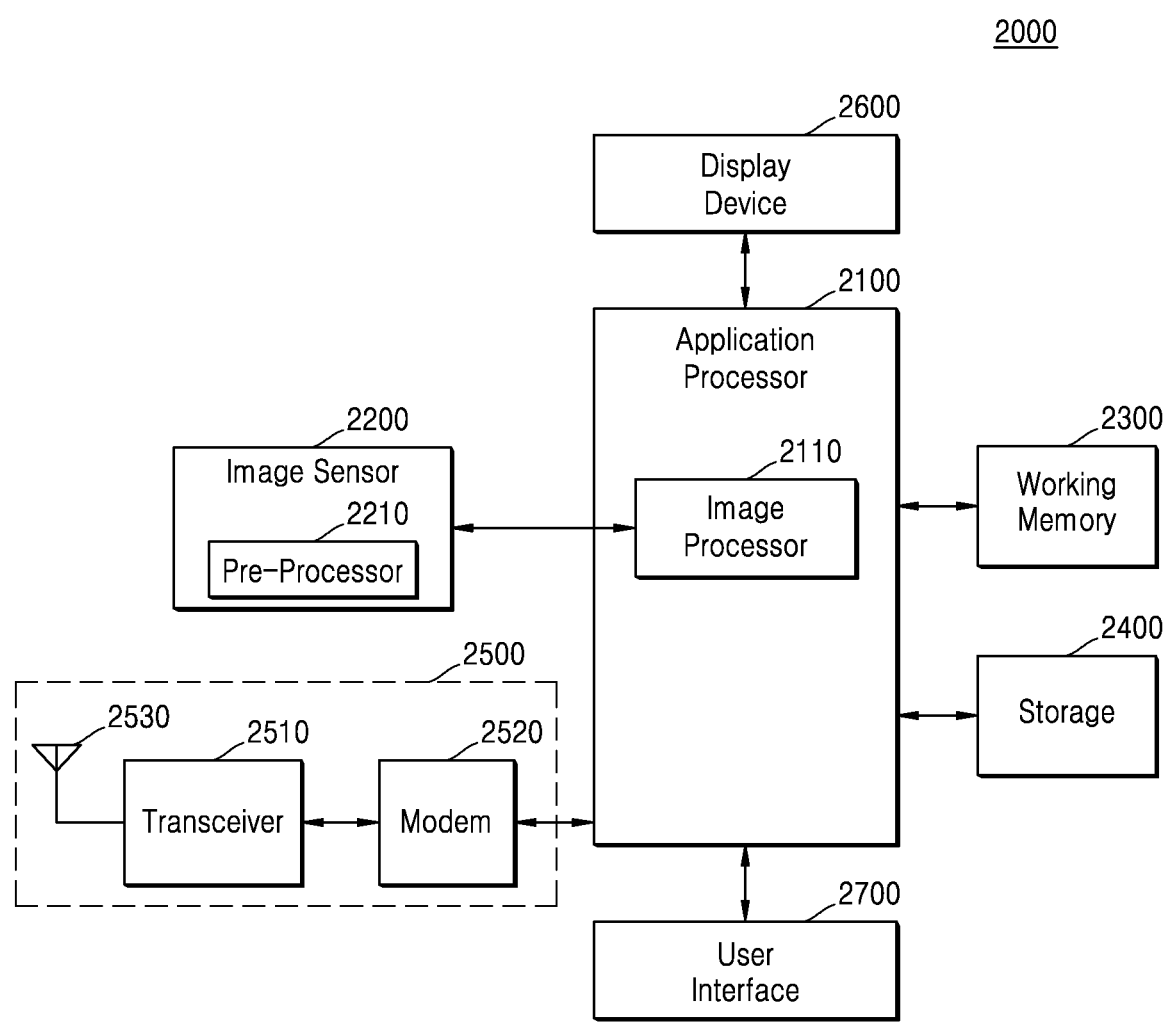
FIG. 14 is a block diagram illustrating an image processing system according to an example embodiment of the inventive concept.

FIG. 14 is a block diagram illustrating an image processing system according to an example embodiment of the inventive concept. An image processing system 2000 illustrated in FIG. 14 may be, for example, a portable terminal.

Referring to FIG. 14, the image processing system 2000 may include an application processor 2100, an image sensor 2200, a display device 2600, a working memory 2300, a storage 2400, a user interface 2700, and a wireless transmission/reception unit 2500.

The application processor 2100 may control all operations of the image processing system 2000 and may be implemented as a system on chip (SoC) that executes, for example, an application program, an operating system, etc. The application processor 2100 may provide image data provided from the image sensor 2200 to the display device 2600 or store the image data in the storage 2400. The application processor 2100 may include an image processor 2110. The image processor 2110 may perform image processing such as, for example, image quality adjustment and data format change, on image data received from the image sensor 2200.

The image sensor described with reference to FIGS. 1 to 10 may be used as the image sensor 2200. The image sensor 2200 may include a pre-processor 2210, and the pre-processor 2210 may include the HDR module or the first HDR module described with reference to FIGS. 1 to 10.

The pre-processor 2210 may perform pre-processing on some images among a plurality of images having different luminance, and transmit the image merged by the pre-processing and the other images to the image processor 2110.

The working memory 2300 may include volatile memory such as, for example, dynamic random access memory (DRAM) or static random access memory (SRMA), or non-volatile resistive memory such as, for example, ferroelectric random access memory (FeRAM), resistive random access memory (RRAM), or phase-change random access memory (PRAM). The working memory 2300 may store a program executed and data processed by the application processor 2100.

The storage 2400 may include a non-volatile memory device such as, for example, NAND flash or resistive memory, and for example, the storage 2400 may be used in a memory card such as a multimedia card (MMC), an embedded multimedia card (eMMC), a secure digital (SD) card, or a micro SD card. The storage 2400 may store image data provided from the image sensor 2200.

The user interface 2700 may include various devices capable of receiving a user input, such as, for example, a keyboard, a curtain key panel, a touch panel, a fingerprint sensor, and a microphone. The user interface 2700 may receive a user input and provide a signal corresponding to the received user input to the application processor 2100.

The wireless transmission/reception unit 2500 may include a transceiver 2510, a modem 2520, and an antenna 2530.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and detail may be made therein without departing from the spirit and scope of the inventive concept as defined by the following claims.

What is claimed is:

1. An image sensor, comprising:
    a pixel array and a readout circuit configured to generate a plurality of images having different exposure times for a same object;
    a pre-processor, disposed within the image sensor, configured to perform a first processing operation on at least two images of the plurality of images to generate a merged image,
    wherein the first processing operation is completed before the merged image is output from the pre-processor;
    an interface circuit configured to output both (i) the merged image, after completion of the first processing operation, and (ii) at least one remaining image of the plurality of images different from the at least two images corresponding to the merged image, to an external processor disposed outside of the image sensor; and
    a controller configured to control the pre-processor to selectively generate the merged image based on information of the plurality of images,
    wherein the external processor is configured to perform a second processing operation on the at least one remaining image after the at least one remaining image is output from the interface circuit,
    wherein the second processing operation is performed after the merged image and the at least one remaining image are received from the image sensor.

2. The image sensor of claim 1, wherein the controller causes the pre-processor to determine whether to generate the merged image based on at least one of imaging technique information, imaging time interval information, and motion information of the plurality of images.

3. The image sensor of claim 1, wherein the pre-processor is configured to perform noise pre-processing on the plurality of images before generating the merged image.

4. The image sensor of claim 3, wherein the noise pre-processing includes motion compensation based on gyro sensor data.

5. The image sensor of claim 1, wherein the plurality of images include a long-exposed image corresponding to a first exposure time, a medium-exposed image corresponding to a second exposure time, and a short-exposed image corresponding to a third exposure time,
    wherein the first exposure time is longer than the second exposure time, and the second exposure time is longer than the third exposure time.

6. The image sensor of claim 5, wherein the pre-processor generates the merged image based on the medium-exposed image and the short-exposed image, and the interface circuit outputs the long-exposed image and the merged image to the external processor.

7. The image sensor of claim 5, wherein the pre-processor is further configured to increase a dynamic range on the plurality of images by performing HDR processing.

8. The image sensor of claim 7, wherein the pre-processor determines weight values based on image information of the long-exposed image, the medium-exposed image, and the short-exposed image, and merges the long-exposed image, the medium-exposed image, and the short-exposed image according to the weight values.

9. The image sensor of claim 1, wherein the plurality of images include a Bayer pattern image and an RGB-W pattern image, and the pre-processor processes the RGB-W pattern image.

10. The image sensor of claim 1, wherein the pre-processor further comprises:
a line buffer that stores a plurality of pixel values corresponding to some lines of the plurality of images,
wherein the pixel array and the readout circuit output the plurality of images to the pre-processor according to a time division method in units of lines.

11. An image processing system, comprising:
an image sensor configured to generate a plurality of images having different exposure times for a same object;
a pre-processor, disposed within the image sensor, configured to perform a first processing operation on at least two images of the plurality of images to generate a merged image with an increased dynamic range;
an interface circuit, disposed within the image sensor, configured to output both (i) the merged image, after completion of the first processing operation, and (ii) at least one remaining image of the plurality of images different from the at least two images corresponding to the merged image, to an image processor disposed outside of the image sensor; and
the image processor configured to receive the at least one remaining image and the merged image, wherein the image processor is configured to perform a second processing operation on the at least one remaining image after the at least one remaining image is output from the interface circuit,
wherein the second processing operation is performed after the merged image and the at least one remaining image are received from the image sensor.

12. The image processing system of claim 11, wherein the pre-processor determines whether to generate the merged image based on at least one of imaging technique information, imaging time interval information, and motion information of the plurality of images.

13. The image processing system of claim 11, wherein the plurality of images include a long-exposed image corresponding to a first exposure time, a medium-exposed image corresponding to a second exposure time, and a short-exposed image corresponding to a third exposure time,
wherein the first exposure time is longer than the second exposure time, and the second exposure time is longer than the third exposure time.

14. The image processing system of claim 13, wherein the pre-processor generates the merged image based on the medium-exposed image and the short-exposed image, and the image processor receives the long-exposed image and the merged image and extends a dynamic range by performing image processing.

15. The image processing system of claim 11, wherein the plurality of images include a Bayer pattern image and an RGB-W pattern image, and the image processing system is configured to process the RGB-W pattern image.

16. An image processing method, comprising:
generating a plurality of images having different exposure times for a same object;
determining one of a first mode, in which a pre-processor disposed within an image sensor performs a first processing operation on at least two images of the plurality of images to generate a merged image with an increased dynamic range, wherein the first processing operation is completed before the merged image is output from the pre-processor, and a second mode, in which the plurality of images are output from the image sensor to an external processor disposed outside of the image sensor, wherein the at least two images are merged after motion compensation processing is performed, based on information of the plurality of images; and
outputting both (i) the merged image, after completion of the first processing operation, and (ii) at least one remaining image of the plurality of images different from the at least two images corresponding to the merged image, from the image sensor to the external processor,
wherein the external processor is configured to perform a second processing operation on the at least one remaining image after the at least one remaining image is output from the image sensor,
wherein the second processing operation is performed after the merged image and the at least one remaining image are received from the image sensor.

17. The image processing method of claim 14, wherein determining one of the first mode and the second mode is based on at least one of imaging technique information, imaging time interval information, and motion information of the plurality of images.

18. The image processing method of claim 14, wherein the plurality of images include a long-exposed image corresponding to a first exposure time, a medium-exposed image corresponding to a second exposure time, and a short-exposed image corresponding to a third exposure time,
wherein the first exposure time is longer than the second exposure time, and the second exposure time is longer than the third exposure time.

19. The image processing method of claim 18, wherein a dynamic range processing mode includes a third mode for performing both the first mode and the second mode, the merged image is generated based on the medium-exposed image and the short-exposed image in the first mode, and image processing for extending a dynamic range is performed by receiving the long-exposed image and the merged image in the second mode.

20. The image processing method of claim 16, wherein the plurality of images include a Bayer pattern image and an RGB-W pattern image, and determining one of the first mode and the second mode comprises determining pattern information of the plurality of images.

* * * * *